United States Patent
He et al.

(10) Patent No.: US 10,205,662 B2
(45) Date of Patent: Feb. 12, 2019

(54) PREFIX DISTRIBUTION-BASED TABLE PERFORMANCE OPTIMIZATION IN SDN

(71) Applicant: Telefonaktiebolaget L M Ericsson (publ), Stockholm (SE)

(72) Inventors: Jiang He, Beijing (CN); Xiaobing Lai, Beijing (CN)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 469 days.

(21) Appl. No.: 14/329,047

(22) Filed: Jul. 11, 2014

(65) Prior Publication Data

US 2016/0014028 A1   Jan. 14, 2016

(51) Int. Cl.
*H04L 12/741* (2013.01)
*H04L 12/743* (2013.01)
*H04L 12/715* (2013.01)

(52) U.S. Cl.
CPC .......... *H04L 45/745* (2013.01); *H04L 45/54* (2013.01); *H04L 45/7457* (2013.01); *H04L 45/64* (2013.01)

(58) Field of Classification Search
CPC .................................................... H04L 45/745
See application file for complete search history.

(56) References Cited

U.S. PATENT DOCUMENTS

2008/0080539 A1* 4/2008 Hong .................. H04L 45/7453
370/402
2008/0186970 A1   8/2008 Wisener et al.
2011/0283061 A1* 11/2011 Reddy .................... G11C 15/00
711/108
2012/0127997 A1* 5/2012 Zinjuwadia ............ H04L 45/04
370/392
2014/0086248 A1   3/2014 Assarpour

OTHER PUBLICATIONS

Fast Updating for TCAM using prefix distribution prediction Aug. 2010 (provided by applicant).*

(Continued)

*Primary Examiner* — Andrew W Chriss
*Assistant Examiner* — Voster Preval
(74) *Attorney, Agent, or Firm* — Patent Portfolio Builders, PLLC

(57) ABSTRACT

Exemplary methods in a first network device in a control plane include generating a prefix distribution list comprising of prefix lengths and corresponding prefix counts, each prefix count identifies a total number of prefixes of each corresponding prefix length. In one embodiment, the methods include generating a priority distribution list comprising of priorities and corresponding rule counts, each rule count identifies a total number of rules of each corresponding priority. In one embodiment, the methods include sending the prefix distribution list to a second network device in a forwarding plane, causing the second network device to generate a forwarding table based on the prefix lengths and corresponding prefix counts. In one embodiment, the methods include sending the priority distribution list to the second network device causing the second network device to generate a forwarding table based on the priorities and corresponding rule counts.

28 Claims, 9 Drawing Sheets

(56) References Cited

OTHER PUBLICATIONS

Ali, et al., "Node-ID Based Resource Reservation Protocol (RSVP) Hello: A Clarification Statement", *Network Working Group, Network Working Group, Request for Comments: 4558, The Internet Society*, (Jun. 2006), 8 pages.

Andersson, L., et al., "LDP Specification", *Network Working Group, Request for Comments: 5036*, (Oct. 2007), 136 pages.

Awduche, D., et al., "RSVP-TE: Extensions to RSVP for LSP Tunnels", *Network Working Group, Request for Comments: 3209, The Internet Society*, http://tools.ietf.org/html/rfc3209, (Dec. 2001), 62 pages.

Babiarz, J., et al., "Configuration Guidelines for DiffServ Service Classes", *Network Working Group, Request for Comments: 4594, The Internet Society*, (Aug. 2006), 57 pages.

Baker, F., "A Differentiated Services Code Point (DSCP) for Capacity-Admitted Traffic", *Internet Engineering Task Force (IETF), Request for Comments: 5865, IETF Trust*, (May 2010), 14 pages.

Baker, F., et al., "Management Information Base for the Differentiated Services Architecture", *Network Working Group, Request for Comments: 3289, The Internet Society*, (May 2002), 116 pages.

Berger, L., "Generalized Multi-Protocol Label Switching (GMPLS) Signaling Resource ReserVation Protocol-Traffic Engineering (RSVP-TE) Extensions", *Network Working Group, Request for Comments: 3473*, http://tools.ietf.org/html/rfc3473, (Jan. 2003), 42 pages.

Bernet, Y, et al., "An Informal Management Model for Diffserv Routers", *Network Working Group, Request for Comments: 3290, The Internet Society*, (May 2002), 56 pages.

Black, D., "Differentiated Services and Tunnels", *Network Working Group, Request for Comments: 2983, The Internet Society*, (Oct. 2000), 14 pages.

Black, D., et al., "Per Hop Behavior Identification Codes", *Network Working Group, Request for Comments: 3140, The Internet Society*, (Jun. 2001), 8 pages.

Blake, S., et al., "An Architecture for Differentiated Services", *Network Working Group, Request for Comments 2475, The Internet Society*, (Dec. 1998), 37 pages.

Borman, D., et al., "IPv6 Jumbograms", *Network Working Group, Request for Comments: 2675, The Internet Society*, (Aug. 1999), 9 pages.

Braden, et al., "Resource ReSerVation Protocol (RSVP)—Version 1 Functional Specification", *Network Working Group, Request for Comments: 2205*, (Sep. 1997), 113 pages.

Chan, K., et al., "Differentiated Services Quality of Service Policy Information Base", *Network Working Group, Request for Comments: 3317, The Internet Society*, (Mar. 2003), 96 pages.

Charny, A., et al., "Supplemental Information for the New Definition of the EF PHB (Expedited Forwarding Per-Hop Behavior)", *Network Working Group, Request for Comments: 3247, The Internet Society*, (Mar. 2002), 24 pages.

Coltun, R., et al., "OSPF for IPv6", *Network Working Group, Request for Comments: 5340*, (Jul. 2008), 95 pages.

Davie, B., et al., "An Expedited Forwarding PHB (Per-Hop Behavior)", *Network Working Group, Request for Comments: 3246, The Internet Society*, (Mar. 2002), 16 pages.

Deering, et al., "Internet Protocol, Version 6 (IPv6) Specification", *Network Working Group, Request for Comments: 2460, The Internet Society*, (Dec. 1998), 39 pages.

Eggert, L., et al., "Unicast UDP Usage Guidelines for Application Designers", *Network Working Group, Request for Comments: 5405, IETF Trust*, (Nov. 2008), 27 pages.

Fenner, B., et al., "Management Information Base for the User Datagram Protocol (UDP)", *Network Working Group, Request for Comments: 4113, The Internet Society*, (Jun. 2005), 19 pages.

Grossman, D., "New Terminology and Clarifications for Diffserv", *Network Working Group, Request for Comments: 3260, The Internet Society*, (Apr. 2002), 10 pages.

Haleplidis, et al., "SDN Layers and Architecture Terminology, draft-haleplidis-sdnrg-layer-terminology-04", *SDNRG Internet-Draft, Internet Engineering Task Force*(IETF), (Mar. 3, 2014), 25 pages.

Hedrick, C., "Routing Information Protocol", *Network Working Group, Request for Comments: 1058*, (Jun. 1988), 34 pages.

Heinanen, J., et al., "Assured Forwarding PHB Group", *The Internet Society, RFC 2597*, (Jun. 1999), 11 pages.

Housley, "Using Advanced Encryption Standard (AES) CCM Mode with IPsec Encapsulating Security Payload (ESP)", *Network Working Group, Request for Comments: 4309, The Internet Society*, (Dec. 2005), 14 pages.

Kent, et al., "Security Architecture for the Internet Protocol", *Network Working Group, Request for Comments: 4301, The Internet Society*, (Dec. 2005), 102 pages.

Kompella, et al., "Procedures for Modifying the Resource reSerVation Protocol (RSVP)", *Network Working Group, Request for Comments: 3936, The Internet Society*, (Oct. 2004), 8 pages.

Malkin, G., "RIP Version 2", *Network Working Group, Request for Comments: 2453, The Internet Society*, (Nov. 1998), 40 pages.

Malkin, et al., "RIPng for IPv6", *Network Workinq Group, Request for Comments: 2080*, (Jan. 1997), 20 pages.

Moy, J., "OSPF Version 2", *Network Working Group, Request for Comments: 2328, The Internet Society*, (Apr. 1998), 245 pages.

Nichols, K., et al., "Definition of Differentiated Services Per Domain Behaviors and Rules for their Specification", *Network Workinq Group, Request for Comments: 3086, The Internet Society*, (Apr. 2001), 24 pages.

Nichols, K., et al., "Definition of the Differentiated Services Field (DS Field) in the IPv4 and IPv6 Headers", *Network Working Group, Request for Comments: 2474, The Internet Society*, (Dec. 1998), 20 pages.

Oran, D., "OSI ISIS Intradomain Routing Protocol", *Network Working Group, Request for Comments: 1142*, (Feb. 1990), 157 pages.

Polk, et al., "A Resource Reservation Protocol (RSVP) Extension for the Reduction of Bandwidth of a Reservation Flow", *Network Working Group, Request for Comments: 4495, The Internet Society*, (May 2006), 22 pages.

Postel, J., "Transmission Control Protocol", *STD 7, RFC 793, Internet Standard*, (Sep. 1981), 91 pages.

Postel, J., "User Datagram Protocol", *Request for Comments: 768*, (Aug. 28, 1980), 3 pages.

Rekhter, Y., et al., "A Border Gateway Protocol 4 (BGP-4)", *Network Working Group, Request for Comments: 4271*, (Jan. 2006), 105 pages.

Rosen, et al., "BGP/MPLS IP Virtual Private Networks (VPNs)", *Network Working Group, Request for Comments: 4364, The Internet Society*, (Feb. 2006), 47 pages.

Shenker, et al., "Specification of Guaranteed Quality of Service", *Network Working Group, Request for Comments: 2212*, (Sep. 1997), 20 pages.

Socolofsky, T., et al., "A TCP/IP Tutorial", *Network Working Group, Request for Comments: 1180*, (Jan. 1991), 28 pages.

Wroclawski, J., "Specification of the Controlled-Load Network Element Service", *Network Working Group, Request for Comments: 2211*, (Sep. 1997), 20 pages.

Wroclawski, J., "The Use of RSVP with IETF Integrated Services", *Network Working Group, Request for Comments: 2210*, (Sep. 1997), 34 pages.

Reddy, "Fast updating algorithm for TCAMs using prefix distribution prediction," ICEIE, International Conference on Electronics and Information Engineering, IEEE, Aug. 1, 2010, pp. V1-400.

Ruiz-Sanchez, et al., "Survey and Taxonomy of IP Address Lookup Algorithms," IEEE Network, vol. 15 No. 2, Mar. 1, 2001, pp. 8-23.

Lim, H. et al. "Priority Tries for IP Address Lookup," XP011303196, vol. 59, No. 6, Jun. 1, 2010, pp. 784-794.

\* cited by examiner

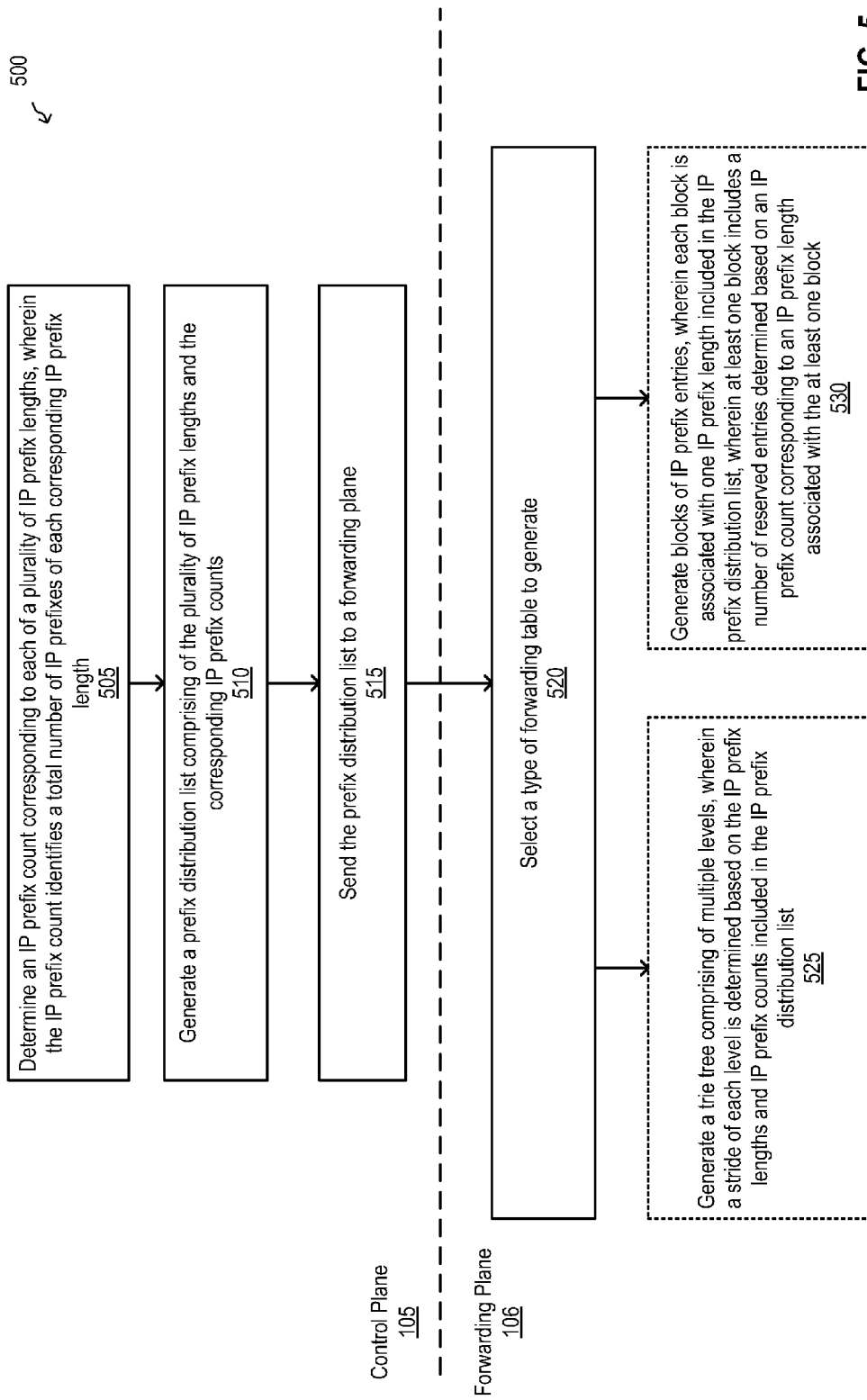

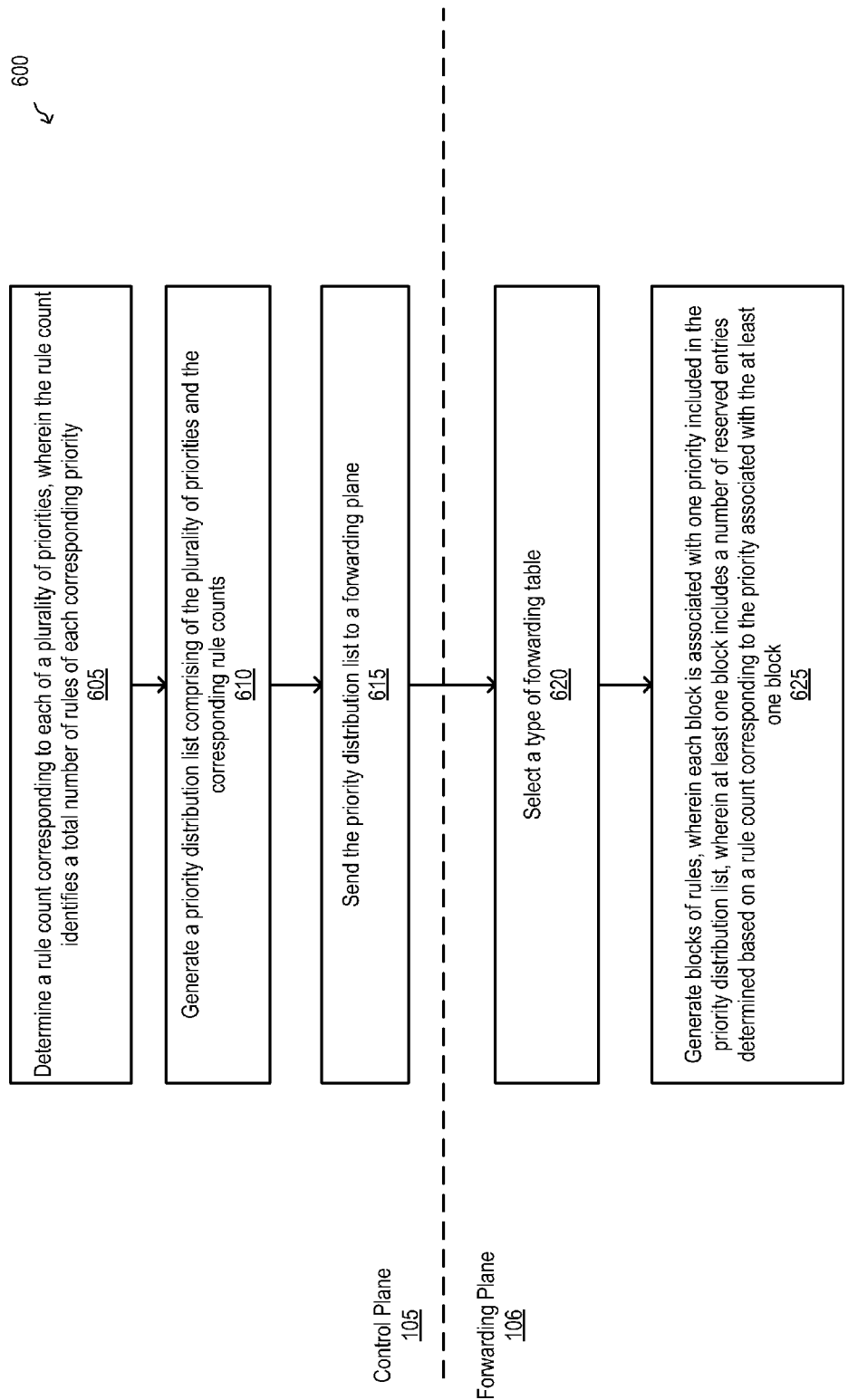

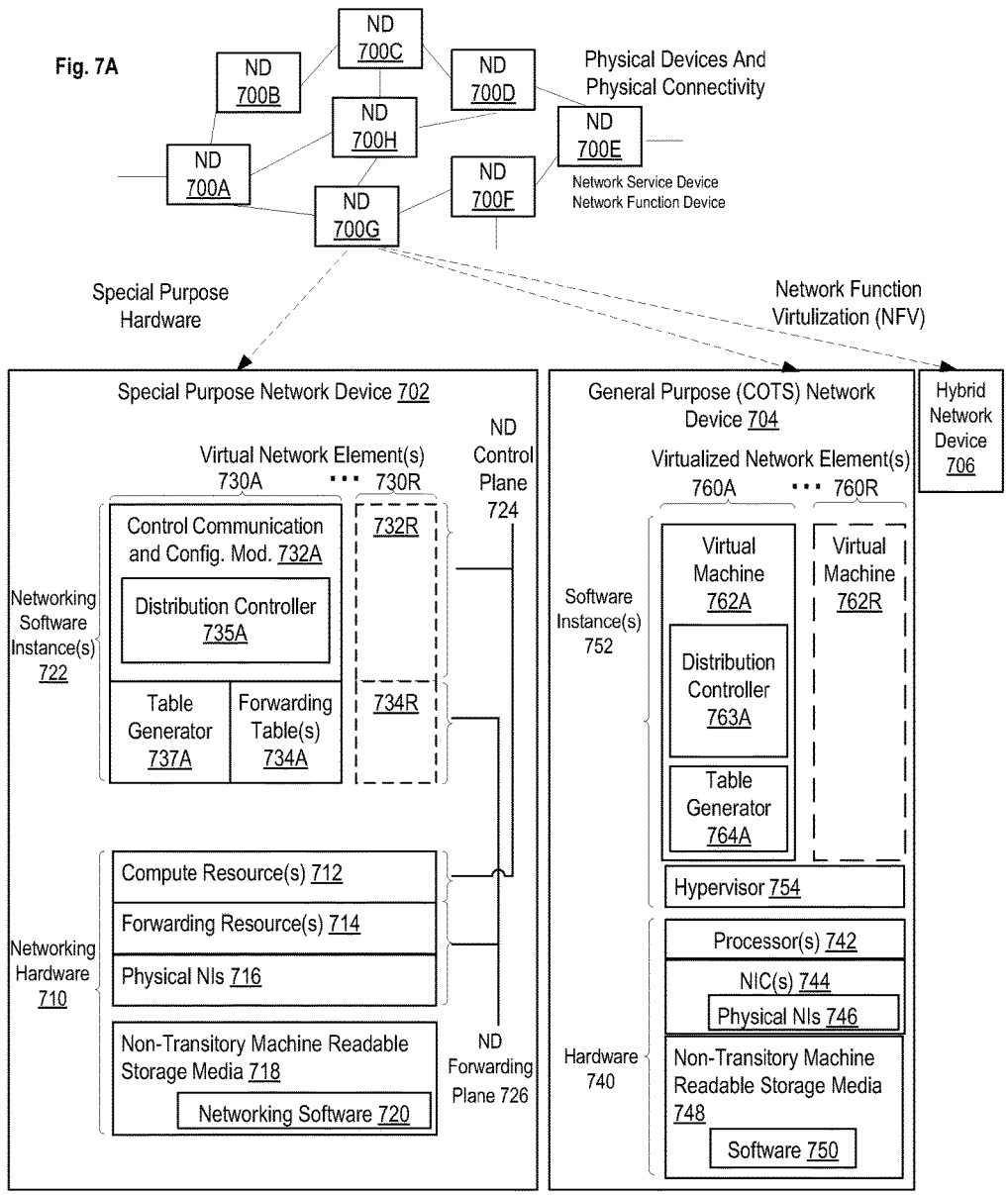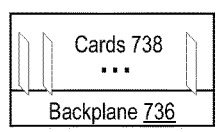

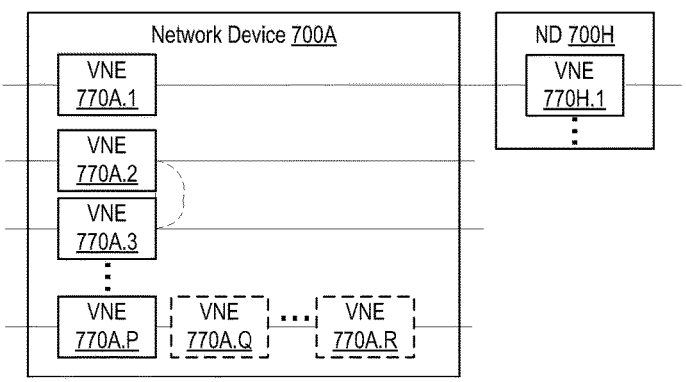
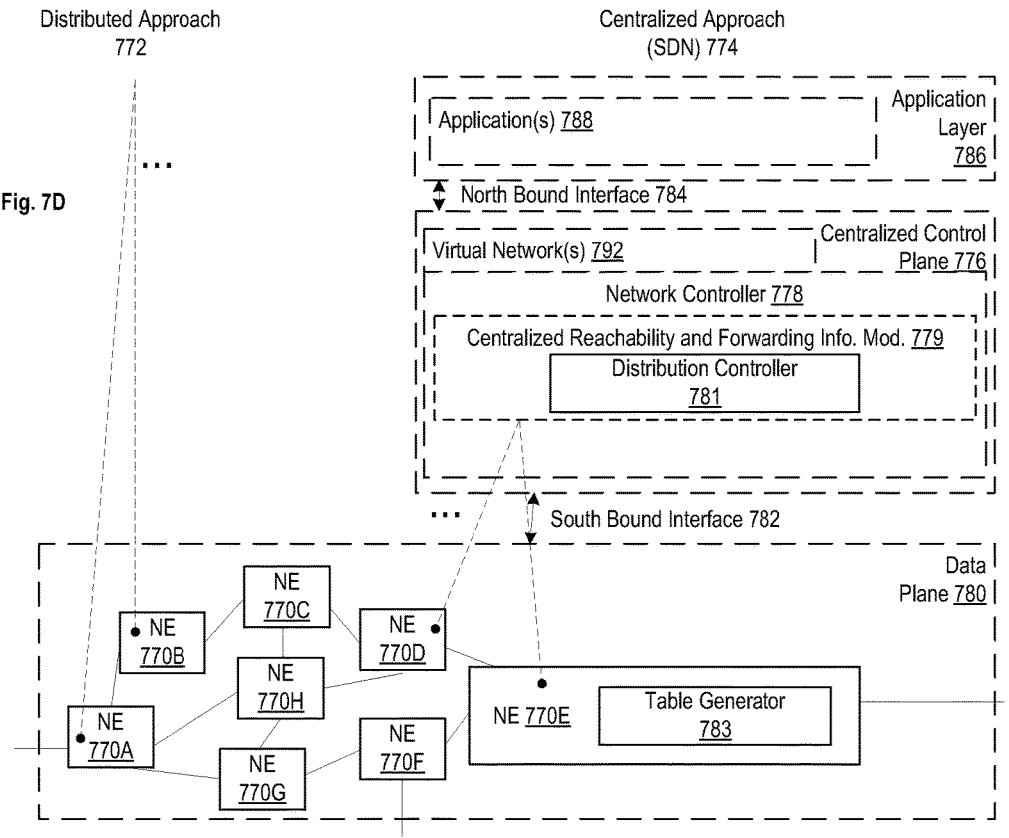
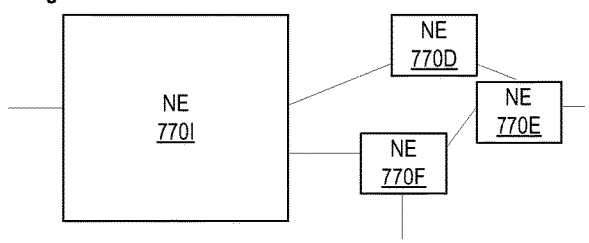
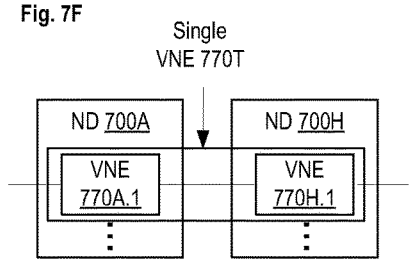

PREFIX DISTRIBUTION-BASED TABLE PERFORMANCE OPTIMIZATION IN SDN

FIELD

Embodiments of the invention relate to the field of packet networks; and more specifically, to the optimization of forwarding tables using prefix distribution information.

BACKGROUND

Software defined networking (SDN) is an approach to networking that enables applications to communicate with and manipulate the control software of network devices and resources. A key aspect of SDN is the abstraction between the forwarding and the control/management planes in order to separate them and provide applications with the means necessary to control the network. This separation provides faster innovation cycles at both planes.

In SDN, the control plane and the forwarding plane communicate via a southbound interface using protocols such as Forwarding and Control Element Separation (ForCES), Network Configuration Protocol (NETCONF), and Interface to the Routing System (I2RS). Through the southbound interface, the control plane manages the forwarding plane behavior by manipulating the corresponding forwarding tables.

A conventional forwarding plane includes a pipeline of functional blocks to handle packets from ingress to egress. The corresponding forwarding tables attached to the functional blocks include ingress/egress Access Control List (ACL), Forwarding Information Base (FIB), Label Forwarding Information Base (LFIB), etc.

Typically, FIBs are implemented in Ternary Content Addressable Memories (TCAMs). The FIB Internet Protocol (IP) prefixes are grouped together based on their prefix lengths and stored in the TCAMs. Although the lookup performance of TCAMs is high, adding an IP prefix entry to the TCAM can be quite slow because it may require IP prefix entries in the TCAM to be moved in order to maintain the IP prefix length grouping. A conventional approach to minimizing IP prefix entry movement is to reserve a number of blank entries for each IP prefix length group. The number of blank entries to reserve for each IP prefix length, however, is not known by the forwarding plane. Without such information, the forwarding plane either over reserves the number of blank entries, in which case memory is wasted. Conversely, the forwarding plane may under reserve the number of blank entries, in which case, IP prefix entry movement is required and update performance is low.

FIBs may also be implemented as trie trees that are stored in Random Access Memories (RAMs). Typically, trie trees include multiple levels of nodes. The performance of these trie trees depends on their strides. As used herein, a "stride" refers to the amount of information (e.g., the number of bits) that is compared/searched during each step (i.e., at each level of the trie tree). By increasing the strides, the performance of trie trees can be increased. Increasing strides, however, also increases hardware resources (e.g., memory) consumption. The strides of trie trees can be specifically tailored (i.e., designed) to improve performance while keeping resource consumption to a minimal if the number of IP prefixes in each IP prefix length group is known by the forwarding plane. In a conventional network architecture, such IP prefix distribution information is not available to the forwarding plane.

ACL rules are also commonly implemented in TCAMs. The rules are grouped together in the TCAM based on their priorities, and are placed in order. Although the lookup performance of TCAMs is high, adding a rule to the TCAM can be quite slow because the rules in the TCAM may have to be moved in order preserve their priorities. Conventionally, blank entries are reserved in the TCAM in order to avoid moving the rules when a new rule is added. The number of blank entries to reserve for each priority group, however, is not known by the forwarding plane. Without such information, the forwarding plane either over reserves the number of blank entries, in which case memory is wasted. Conversely, the forwarding plane may under reserve the number of blank entries, in which case, rule movement is required and update performance is low.

SUMMARY

Exemplary methods in a first network device operating in a control plane for sending Internet Protocol (IP) prefix distribution information to a second network device operating in a forwarding plane includes generating an IP prefix distribution list comprising of a plurality of IP prefix lengths and corresponding IP prefix counts, wherein each IP prefix count identifies a total number of IP prefixes of each corresponding IP prefix length. In one embodiment, the methods include sending the IP prefix distribution list to the second network device, wherein the IP prefix distribution list causes the second network device to generate an IP forwarding table based on the IP prefix lengths and corresponding IP prefix counts included in the IP prefix distribution list.

According to one embodiment, the IP prefix distribution list causes the second network device to generate a trie tree comprising of a plurality of levels, wherein a stride of each level of the trie tree is determined based on the IP prefix lengths and IP prefix counts included in the IP prefix distribution list. In one such embodiment, the stride of each level of the trie tree is determined based on an IP prefix length corresponding to IP prefix counts in the IP prefix distribution list.

In one embodiment, the IP prefix distribution list causes the second network device to generate a plurality of blocks of IP prefix entries, wherein each block of IP prefix entries is associated with one IP prefix length included in the IP prefix distribution list, and wherein at least one block of the plurality of blocks of IP prefix entries includes a number of reserved entries, wherein the number of reserved entries is determined based on an IP prefix count corresponding to an IP prefix length associated with the at least one block.

According to one embodiment, the methods further include generating a priority distribution list comprising of a plurality of priorities and corresponding rule counts, wherein each rule count identifies a total number of rules of each corresponding priority. In such an embodiment, the methods further include sending the priority distribution list to the second network device, wherein the priority distribution list causes the second network device to generate an ACL table based on the priorities and corresponding rule counts included in the priority distribution list.

In one embodiment, the priority distribution list causes the second network device to generate a plurality of blocks of rule entries, wherein each block of rule entries is associated with one priority included in the priority distribution list, and wherein at least one block of the plurality of blocks of rule entries includes a number of reserved entries, wherein the number of reserved entries is determined based on a rule count corresponding to a priority associated with the at least one block.

Exemplary methods in a first network device operating in a forwarding plane for generating Internet Protocol forwarding tables based on IP prefix distribution information received from a second network device operating in a control plane include receiving an IP prefix distribution list from the second network device, the IP prefix distribution list comprising of a plurality of IP prefix lengths and corresponding IP prefix counts, wherein each IP prefix count identifies a total number of IP prefixes of each corresponding IP prefix length. In one embodiment, the methods include generating an IP forwarding table based on the IP prefix lengths and corresponding IP prefix counts included in the IP prefix distribution list.

In one embodiment, generating the IP forwarding table comprises the first network device generating a trie tree comprising of a plurality of levels, wherein a stride of each level of the trie tree is determined based on the IP prefix lengths and IP prefix counts included in the IP prefix distribution list, wherein the stride of each level of the trie tree is determined based on an IP prefix length corresponding to IP prefix counts in the IP prefix distribution list.

In one embodiment, generating the IP forwarding table comprises the first network device generating a plurality of blocks of IP prefix entries, wherein each block of IP prefix entries is associated with one IP prefix length included in the IP prefix distribution list, wherein at least one block of the plurality of blocks of IP prefix entries includes a number of reserved entries, wherein the number of reserved entries is determined based on an IP prefix count corresponding to an IP prefix length associated with the at least one block. In one such embodiment, the plurality of blocks of IP prefix entries are generated in a ternary content addressable memory (TCAM), and wherein the plurality of blocks of IP prefix entries are contiguously located in the TCAM.

According to one embodiment, the exemplary methods further include receiving a priority distribution list from the second network device priority distribution list comprising of a plurality of priorities and corresponding rule counts, wherein each rule count identifies a total number of rules of each corresponding priority, and generating an ACL table based on the priorities and corresponding rule counts included in the priority distribution list. In one such embodiment, generating the ACL table comprises the first network device generating a plurality of blocks of rule entries, wherein each block of rule entries is associated with one priority included in the priority distribution list, wherein at least one block of the plurality of blocks of rule entries includes a number of reserved entries, wherein the number of reserved entries is determined based on a rule count corresponding to a priority associated with the at least one block.

BRIEF DESCRIPTION OF THE DRAWINGS

The invention may best be understood by referring to the following description and accompanying drawings that are used to illustrate embodiments of the invention. In the drawings:

FIG. 5 is a flow diagram illustrating a method for generating forwarding tables based on prefix distribution information according to one embodiment.

FIG. 6 is a flow diagram illustrating a method for generating forwarding tables based on priority distribution information according to one embodiment.

FIG. 7A illustrates connectivity between network devices (NDs) within an exemplary network, as well as three exemplary implementations of the NDs, according to some embodiments of the invention.

FIG. 7B illustrates an exemplary way to implement the special-purpose network device 702 according to some embodiments of the invention.

FIG. 7C illustrates various exemplary ways in which virtual network elements (VNEs) may be coupled according to some embodiments of the invention.

FIG. 7D illustrates a network with a single network element (NE) on each of the NDs of FIG. 7A, and within this straight forward approach contrasts a traditional distributed approach (commonly used by traditional routers) with a centralized approach for maintaining reachability and forwarding information (also called network control), according to some embodiments of the invention.

FIG. 7E illustrates the simple case of where each of the NDs 700A-H implements a single NE 770A-H (see FIG. 7D), but the centralized control plane 776 has abstracted multiple of the NEs in different NDs (the NEs 770A-C and G-H) into (to represent) a single NE 770I in one of the virtual network(s) 792 of FIG. 7D, according to some embodiments of the invention.

FIG. 7F illustrates a case where multiple VNEs (VNE 770A.1 and VNE 770H.1) are implemented on different NDs (ND 700A and ND 700H) and are coupled to each other, and where the centralized control plane 776 has abstracted these multiple VNEs such that they appear as a single VNE 770T within one of the virtual networks 792 of FIG. 7D, according to some embodiments of the invention.

DESCRIPTION OF EMBODIMENTS

Figure 1:
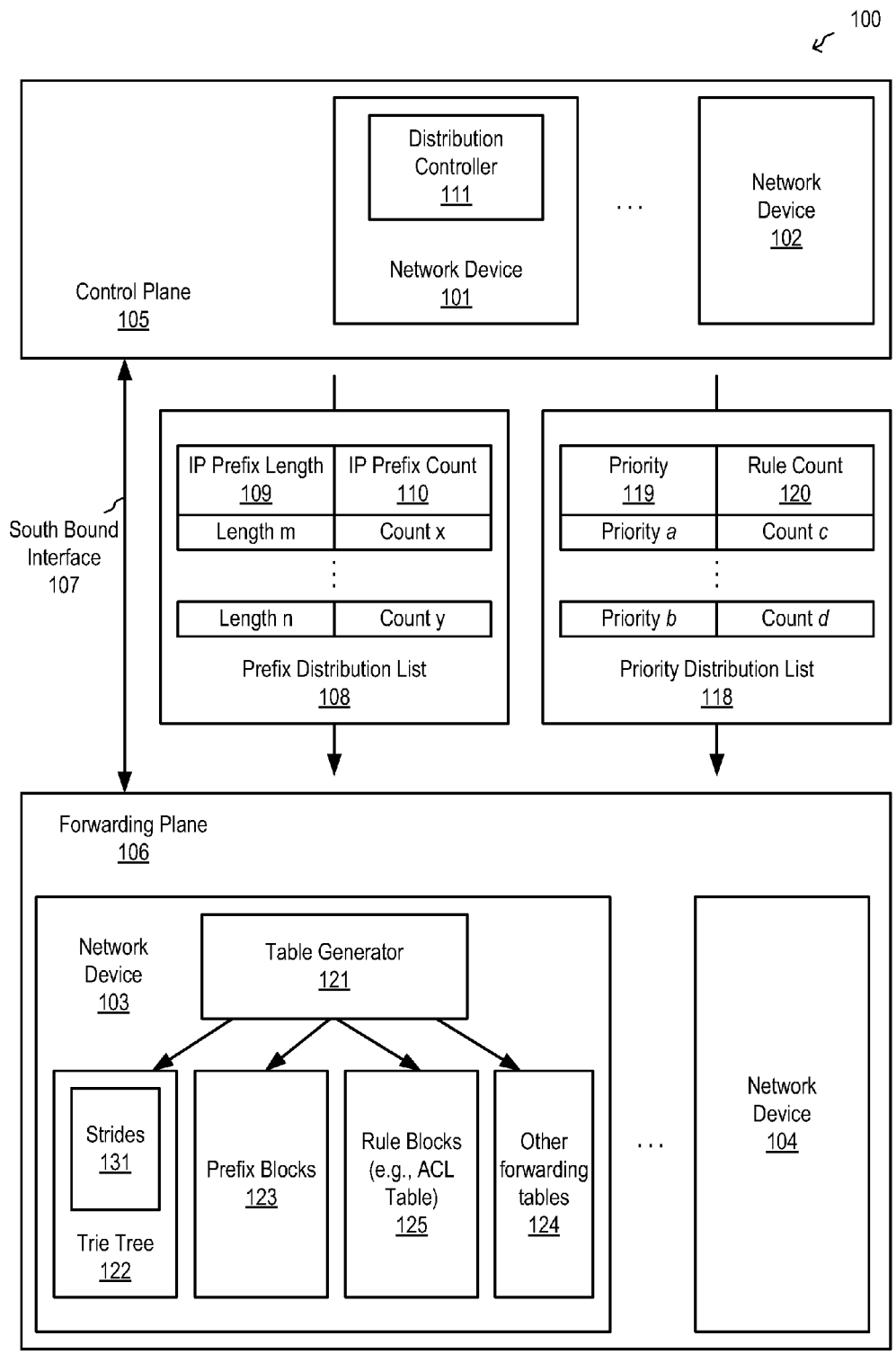
FIG. 1 is a block diagram illustrating a SDN network according to one embodiment.

The following description describes methods and apparatus for distributing prefix information. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details.

In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A routing table, or routing information base (RIB), is a data table stored in a router or a networked computer that lists the routes to particular network destinations, and in some cases, metrics (distances) associated with those routes. The RIB is where all IP routing information is stored. It is not specific to any routing protocol, but rather a repository where all the routing protocols place all of their routes. Routes are inserted into the RIB whenever a routing protocol running on the router learns a new route. When a destination becomes unreachable, the route is first marked unusable and later removed from the RIB as per the specifications of the routing protocol they were learned from. The RIB is not used for forwarding IP datagrams, nor is it advertised to the rest of the network to which the router is attached.

A Forwarding Information Base (FIB) is used to make IP destination prefix-based switching decisions. The FIB contains the interface identifier and next hop information for each reachable destination IP prefix. The FIB is conceptually similar to a routing table. It maintains a mirror image of the forwarding information contained in the IP routing table.

When IP routes are copied from routing table to FIB, their next hops are resolved, outgoing interfaces are computed, and multiple entries are created when the next-hop resolution results in multiple paths to the same destination. The number of entries within a FIB is one of the key elements that may influence the forwarding performance of a router. Generally, the more entries within the FIB, the longer it could take to find the longest matching network prefix within the forwarding information base. This architecture of having a RIB and a FIB separates the control plane function of the routing table from the forwarding plane function of the forwarding table. This separation of control and forwarding provides uninterrupted performance.

In some architecture, the FIB forwarding table is implemented as a trie tree in RAM, which serves as a lookup table of IP prefixes. An IP address can be represented as A.B.C.D/n, where "In" is called the IP prefix or network prefix, and the value "n" is the prefix length. The IP prefix identifies the number of significant bits used to identify a network. For example, 192.168.1.0/24 means the first 24 bits are used to represent the network and the remaining 8 bits are used to identify hosts. In this example, the prefix length is 24. In a typical network, multiple prefixes may have the same prefix length. For example, prefixes 192.168.1.0/24, 192.168.2.0/24, 192.168.3.0/24 all have the same prefix length of 24.

The performance of a trie tree is determined by its strides planning. A stride, as used herein, refers to the amount of information (e.g., the number of bits) that is searched at the same time at each level of the tree. The performance of a trie tree can be increased simply by increasing its strides. Increasing the strides, however, also increases hardware resource consumption. The strides can be tailored such that hardware resources can be used to focus the search performance on the prefix length with the most prefixes. A conventional control plane, however, does not provide the prefix distribution to the forwarding plane.

In some architecture, the FIB forwarding table is implemented as a lookup table of prefixes in TCAM, where the prefixes are grouped together based on prefix lengths. The lookup performance of a TCAM is high. Updating the TCAM lookup table, however, can be quite slow because prefixes may have to be moved in order to preserve the prefix length grouping. A conventional approach to minimizing prefix movement is to reserve a number of blank entries for each prefix length group. The number of blank entries to reserve for each prefix length, however, is not known by a conventional forwarding plane. Without such information, the forwarding plane either over reserves the number of blank entries, in which case memory is wasted. Conversely, the forwarding plane may under reserve the number of blank entries, in which case, prefix movement is required and update performance is low.

Access Control Lists (ACLs) are filters that enable a router to control which routing updates or packets are permitted or denied in or out of a network. ACLs are used by network administrators to filter traffic and to provide extra security for their networks. A router acts as a packet filter when it forwards or denies packets according to ACL rules (herein simply referred to as rules). As used herein, a "rule" refers to some characteristics of a packet which is used to determine what type of action should be taken for the packet. A rule can be the source and destination IP addresses, the source and destination port, the source and destination media access control (MAC) addresses, the protocol of the packet, or any combination thereof. Each rule is mapped to an action. Here, an "action" refers to some operation that is to be performed on the packet with characteristics that match the rule. For example, an action can be "permit", which allows the packet to be forwarded. An action can also be "deny", which causes the packet to be discarded. The rules can be mapped to other actions.

The ACL can be implemented as a lookup table in a TCAM. For example, in the case where the ACL rule includes just the IP prefixes, the IP prefixes are grouped together in the TCAM based on their prefix lengths. The limitations of updating the prefixes in a TCAM are described above. The ACL can also be implemented in a TCAM such that the rules are grouped together in a TCAM based on their priorities. Priorities are important because rules can be inserted in a TCAM with wildcards, thus, an incoming packet can match multiple rules. In cases where an incoming packet matches multiple rules, the action corresponding to the rule with the highest priority is performed on the packet. By way of example, assume that the rule comprises the source IP prefix, destination IP prefix, source MAC address, and destination MAC address. Assume that the first rule and the second rule in the TCAM are:

192.168.1.*.10.100.1.*:*:*:*:*:*:*:*:*:*:*:*:*
*.*.*.*.*.*.*.*.*:*:*:*:*:*:11:12:13:14:15:16, respectively.

Assume that the first rule has a higher priority than the second rule. Assume that the first rule is mapped to a "deny action" and the second rule is mapped to a "permit" action. Assume that an incoming packet has a source IP address of 192.168.1.100, destination IP address of 10.100.1.5, source MAC address of 01.02.03.04.05.06, and destination MAC address of 11.12.13.14.15.16. Thus, the incoming packet has a key of "192.168.1.100.10.100.1.5.01.02.03.04.05.06.11.12.13.14.15.16". This key matches both the first rule and the second rule in the TCAM. However, the first rule has a higher priority, so the "deny" action is applied and the "permit" action is ignored. Thus, the incoming packet is dropped.

In order to preserve the priorities of the rules, when new rules are inserted, existing rules in the TCAM may need to be moved. Conventionally, blank entries are reserved in order to minimize the movement of rules within a TCAM. The number of blank entries to reserve for each priority, however, is not known by a conventional forwarding plane. Without such information, the forwarding plane either over reserves the number of blank entries, in which case memory is wasted. Conversely, the forwarding plane may under reserve the number of blank entries, in which case, rule movement is required and update performance is low.

Embodiments of the present invention overcome these limitations by providing mechanisms for a control plane to send prefix distribution and/or priority distribution information to a forwarding plane.

Techniques for sending IP prefix distribution information to a forwarding plane are described herein. According to one embodiment, a first network device in a control plane determines the number of IP prefixes (herein simply referred to as prefixes) of one or more prefix lengths. The first network device then generates an IP prefix distribution list comprising of a plurality of prefix lengths and corresponding prefix counts, wherein each prefix count identifies a total number of prefixes of each corresponding prefix length. The first network device sends the prefix distribution list to a second network device operating in the forwarding plane, wherein the prefix distribution list causes the second network device to generate an IP forwarding table based on the prefix lengths and corresponding prefix counts included in the prefix distribution list.

Techniques for sending priority distribution information to a forwarding plane are described herein. According to one embodiment, a first network device in a control plane determines the number of ACL rules (herein simply referred to as rules) of one or more priorities. The first network device then generates a priority distribution list comprising of a plurality of priorities and corresponding rule counts, wherein each rule count identifies a total number of rules of each corresponding priority. The first network device sends the priority distribution list to the second network device operating in the forwarding plane, wherein the priority distribution list causes the second network device to generate an ACL table based on the priorities and corresponding rule counts included in the priority distribution list.

Techniques for generating IP forwarding tables based on prefix distribution information are described herein. According to one embodiment, in response to receiving the prefix distribution list, the second network device generates an IP forwarding table based on the prefix lengths and corresponding prefix counts included in the prefix distribution list. In one such embodiment, the second network device generates a trie tree, wherein the strides are determined based on prefix lengths and corresponding prefix counts included in the prefix distribution list.

In another embodiment, in response to receiving the prefix distribution list, the second network device generates blocks of prefix entries in a TCAM, wherein each block of prefix entries is associated with one prefix length included in the prefix distribution list. In such an embodiment, one or more of the blocks includes a number of reserved prefix entries. The second network device determines the number of entries to reserve for each block based on the prefix count corresponding to the prefix length of the respective block.

Techniques for generating ACL tables based on priority distribution information are described herein. According to one embodiment, in response to receiving the priority distribution list, the second network device generates an IP forwarding table based on the priorities and corresponding rule counts included in the priority distribution list. In one such embodiment, the second network device generates blocks of rule entries in a TCAM, wherein each block of rule entries is associated with one priority included in the priority distribution list. In such an embodiment, one or more of the blocks of rule entries includes a number of reserved rule entries. The second network device determines the number of entries to reserve for each block of rule entries based on the rule count corresponding to the priority of the respective block.

FIG. 1 is a block diagram illustrating network 100 according to one embodiment. Network 100 includes control plane 105 and forwarding plane 106. In the illustrated embodiment, control plane 105 includes network devices 101-102. It shall be understood, however, that more network devices can be included as part of control plane 105. Forwarding plane 106 includes network devices 103-104. It shall be understood, however, that more network devices can be included as part of forwarding plane 106. Network devices 101-102 of control plane 105 communicate with network devices 102-103 of forwarding plane 106 via southbound interface 107 using protocols such as Forwarding and Control Element Separation (ForCES), Network Configuration Protocol (NETCONF), and Interface to the Routing System (I2RS). Other protocols, however, can be utilized to implement southbound interface 107 without departing from the broader scope and spirit of the present invention.

According to one embodiment, network device 101 includes distribution controller 111. In one embodiment, distribution controller 111 is to determine the number of prefixes of one or more prefix lengths. By way of illustration, assume that the network includes prefixes 192.168.1.0/24, 192.168.2.0/24, 192.168.3.0/24. In such an example, the prefix distribution information may indicate that the number of prefixes of prefix length 24 is 3. The prefix distribution information, however, may also include reserved prefixes for one or more prefix lengths (described in further details below). Once the prefix distribution information is determined, distribution controller 111 sends the prefix distribution information to network device 103, for example, as part of prefix distribution list 108.

According to one embodiment, prefix distribution list 108 includes one or more prefix lengths 109 and corresponding prefix counts 110. Each of prefix lengths 109 identifies the prefix length supported by network 100. Each of prefix counts 110 indicates the number of prefixes having a prefix length indicated by corresponding prefix length 109. In the illustrated example, prefix distribution list 108 includes prefix length m and prefix length n, with corresponding count x and count y. It is to be appreciated, however, that more prefix lengths and corresponding prefix counts can be included as part of prefix distribution list 108. One having ordinary skill in the art would recognize that various other implementations may be utilized to represent the prefix distribution information.

According to one embodiment, distribution controller 111 is to determine the number of rules of one or more priorities. By way of illustration, assume that the ACL includes rule 1, rule 2, and rule 3, which have a priority 0 (which in one embodiment, is the highest priority). Assume further that the ACL includes rule 4 and rule 5, which have a priority of 1. In such an example, the priority distribution information may indicate that there are 3 rules having a priority 0, and 2 rules having a priority 1. The priority distribution information, however, may also include reserved rules for one or more priorities (described in further details below). Once the priority distribution information is determined, distribution controller 111 sends the priority distribution information to network device 103, for example, as part of priority distribution list 118.

According to one embodiment, priority distribution list 118 includes one or more priorities 119 and corresponding rule counts 120. Each of priorities 119 identifies a priority in an ACL. Each of rule counts 120 indicates the number of rules having a priority indicated by corresponding priority 119. In the illustrated example, priority distribution list 118 includes priority a and priority b, with corresponding rule count c and rule count d. It is to be appreciated, however, that more priorities and corresponding rule counts can be included as part of priority distribution list 118. One having ordinary skill in the art would recognize that various other implementations may be utilized to represent the priority distribution information.

According to one embodiment, network device 103 includes table generator 121 for generating forwarding tables, such as, for example, trie tree 122, prefix blocks 123, rule blocks 125, and other forwarding tables 124. In one embodiment, table generator 121 is to generate these forwarding tables based on prefix distribution list 108 and/or priority distribution list 118. In one embodiment, table generator 121 determines which type of forwarding table to generate. In an alternative embodiment, distribution controller 111 determines which type of forwarding table to generate, and sends such information to table generator 121, for example, as part of prefix distribution list 108 or priority distribution list 118.

In one embodiment, table generator 121 generates trie tree 122 based on prefix distribution list 108. For example, trie tree 122 may implement a FIB or an ACL table. Trie tree 122, however, can implement a lookup table for any function. A trie tree is an ordered tree data structure that is used to store a dynamic set or associative array where the keys are usually strings. Unlike a binary search tree, no node in the tree stores the key associated with that node. Instead, the node's position in the tree defines the key with which it is associated. All the descendants of a node have a common prefix of the string associated with that node, and the root is associated with the empty string. Values are normally not associated with every node, only with leaves and some inner nodes that correspond to keys of interest. Though trie trees are most commonly keyed by character strings, they don't need to be. The same algorithms can easily be adapted to serve similar functions of ordered lists of any construct, e.g., permutations on a list of digits or shapes. In particular, a bitwise trie tree is keyed on the individual bits making up a short, fixed size of bits such as an integer number, memory address, an IP address, etc.

Figure 2:
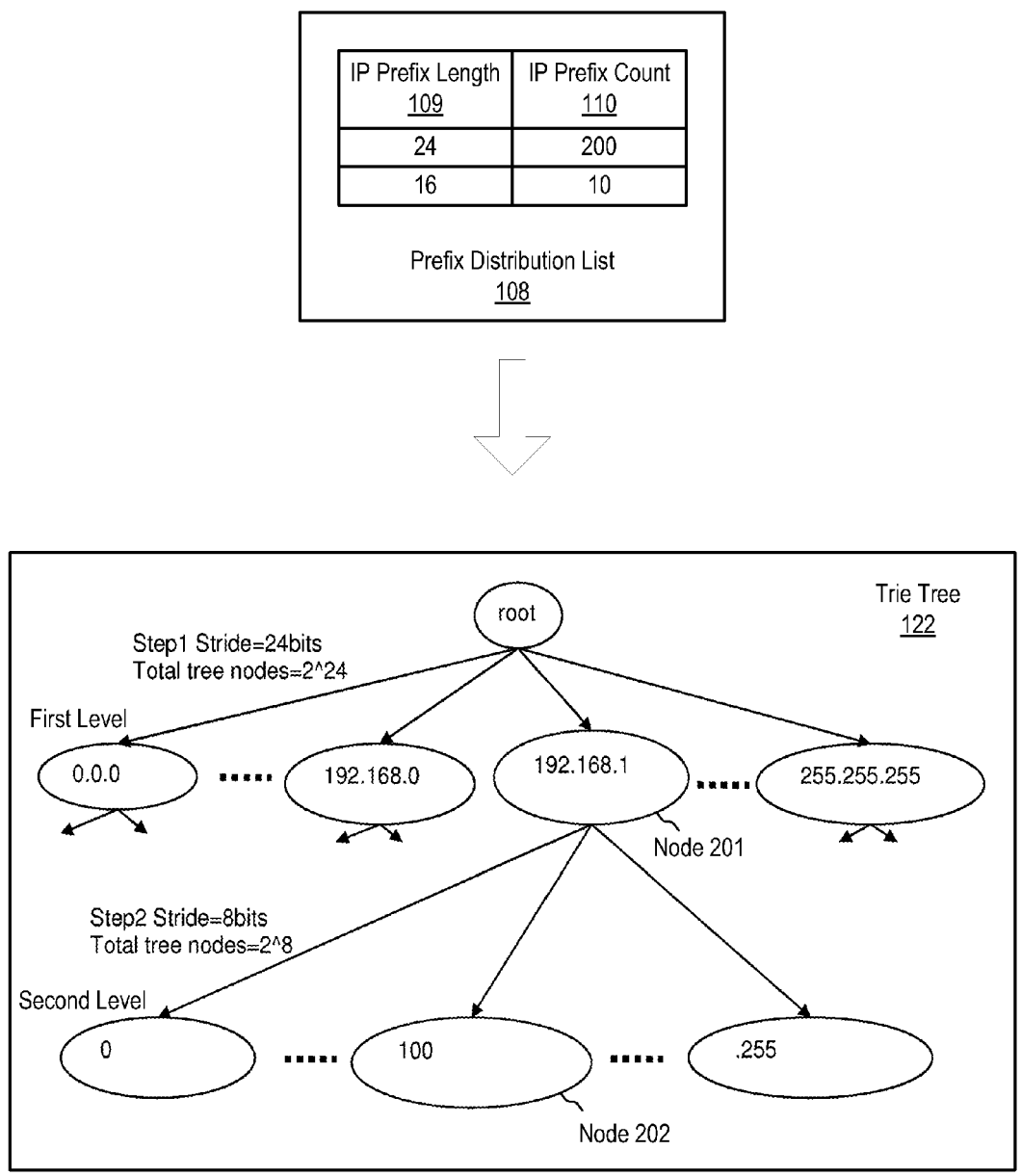
FIG. 2 is a block diagram illustrating a mechanism for generating a trie tree based on prefix distribution information according to one embodiment.

Trie tree 122 may include multiple levels as shown in FIG. 2, described in further details below. The performance of trie tree 122 is determined in part by strides 131. Here, strides 131 represent the strides of each level of trie tree 122. A stride, as used herein, refers to the amount of information (e.g., the number of bits) that is searched at the same time at each level of the tree. Thus, strides 131 determine the depth of trie tree 122, which in turn, determines the maximum number of steps required to perform a search in the worst case scenario. The performance of trie tree 122 can be increased simply by increasing strides 131. Increasing strides 131, however, also increases hardware resource consumption. Contrary to a conventional implementation of a trie tree (which cannot be optimized based on prefix distribution information), table generator 121 utilizes prefix distribution list 108 to determine strides 131 such that trie tree 122 is tailored toward (i.e., biased toward) the prefix length with the most prefixes.

FIG. 2 is block diagram illustrating table generator 121 generating trie tree 122 based on prefix distribution list 108 according to one embodiment. Referring now to the embodiment illustrated in FIG. 2, which assumes that table generator 121 has received prefix distribution list 108 from distribution controller 111. Prefix distribution list 108, in this example, includes a prefix length 24 with a corresponding prefix count of 200, and a prefix length of 16 with a corresponding prefix count of 10. Thus, prefix distribution list 108 indicates that there are 200 prefixes having a prefix length of 24, and 10 prefixes having a prefix length of 16. In other words, prefix distribution list 108 indicates that most of the prefixes (i.e., 200 out of 210 prefixes) in the network belong to the prefix group having a length of 24 bits.

In one embodiment, based on the prefix distribution information, table generator 121 determines strides 131 such that the performance of trie tree 122 is focused on prefix length 24. For example, table generator 121 determines that the stride of the first level should be 24 bits because most of the prefixes have a length of 24 bits. Assuming trie tree 122 is implemented for IP version 4 (IPv4), the second level of trie tree 122 should have a stride of 8 bits. Thus, contrary to a conventional trie tree implementation, table generator 121 is able to utilize prefix distribution information to intelligently allocate hardware resources to trie tree 122 such that the search is optimized for most of the cases. Throughout the description, embodiments of the present invention are described using IPv4 (i.e., IP addresses with 32 bits). It shall be understood that the present invention is not limited to any IP address length. For example, embodiments of the present invention apply equally to IP version 6 (IPv6) (i.e., IP addresses with 128 bits).

An example of a lookup process utilizing trie tree 122 will now be described. Assume that network device 103 receives a packet with a source IP address 192.168.1.100, and that network device 103 must search for this source IP address in trie tree 122. As a first step, network device 103 searches a first set of bits (comprising of 24 bits) of the source IP address (i.e., 192.168.1) in the first level because the stride of the first level is 24. In this example, network device 103 locates "192.168.1" at node 201. As a second step, network device 103 searches a second set of bits (comprising of 8 bits) of the source IP address (i.e., 100) at the second level because the stride of the second level is 8. In this example, network device 103 locates "100" at node 202. Thus, the input source IP address 192.168.1.100 is located in trie tree 122 within 2 steps. The located node typically maps to information/characteristics associated with the input key. For example, in the case where trie tree 122 implements a FIB, node 202 can map to an output port, so that input traffic with the source IP address 192.168.1.100 is forwarded to the identified output port. By way of further example, in the case where trie tree 122 implements an ACL, node 202 can map to an action to be performed on the packet.

The strides selected above for trie tree 122 are for illustrative purposes, and not intended to be limitations of the present invention. One having ordinary skill in the art would recognize that other strides can be selected. Note that without the benefits of prefix distribution list 108, a conventional trie tree may be implemented with strides that are less than 24 at the first level, resulting in poor performance in most cases. Conversely, without the benefits of prefix distribution list 108, a conventional trie tree can be implemented with strides greater than 24 at the first level, thus wasting of resources by being too aggressive with the performance without realizing any performance gains.

Referring now back to FIG. 1. In one embodiment, table generator 121 generates prefix blocks 123 based on prefix distribution list 108. For example, prefix blocks 123 may implement a FIB or an ACL table. Prefix blocks 123, however, can implement a lookup table for any function. According to one embodiment, prefix blocks 123 is implemented in a TCAM. In such an embodiment, prefix blocks 123 represents one or more blocks of prefix entries, wherein each of the blocks is associated with a prefix length included in prefix distribution list 108. Thus, the prefixes stored in the entries of each block have the same prefix length. In one embodiment, not all of the entries in each block are used. For example, some of the entries may store prefixes while others are blank entries reserved for future insertions of prefixes. In one embodiment, table generator 121 determines the number of blank entries to include in a block based on the prefix count included in prefix distribution list 108 corresponding to the prefix length of the block.

Figure 3:
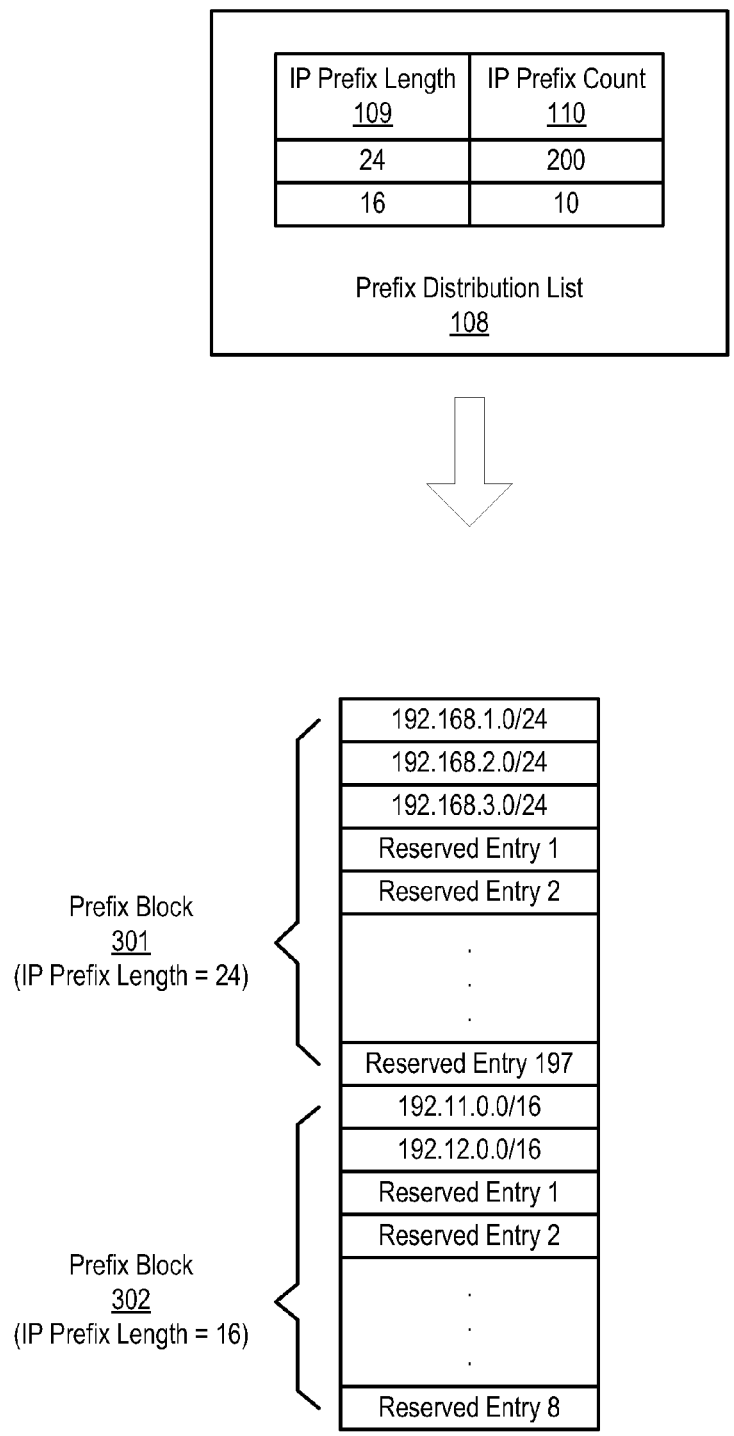
FIG. 3 is a block diagram illustrating a mechanism for generating prefix blocks with reserved blank entries in a TCAM based on prefix distribution information according to one embodiment.

FIG. 3 is block diagram illustrating table generator 121 generating prefix blocks 301-302 based on prefix distribution list 108 according to one embodiment. Referring now to the embodiment illustrated in FIG. 3, which assumes that table generator 121 has received prefix distribution list 108 from distribution controller 111. Prefix distribution list 108, in this example, includes a prefix length 24 with a corresponding prefix count of 200, and a prefix length of 16 with a corresponding prefix count of 10. Thus, prefix distribution list 108 indicates that there are 200 prefixes having a prefix length of 24, and 10 prefixes having a prefix length of 16.

In one embodiment, based on the prefix distribution information, table generator 121 generates prefix blocks 301 and 302. Prefix block 301 is associated with the prefix length 24 included in prefix distribution list 108, and thus, entries of the block either contain prefixes of length 24, or are left blank and reserved for future insertions of prefixes of length 24. Prefix block 302 is associated with the prefix length 16 included in prefix distribution list 108, and thus, entries of the block either contain prefixes of length 16, or are left blank and reserved for future insertions of prefixes of length 16.

In this example, table generator 121 determines that there are currently 3 prefixes with the length 24 (i.e., prefixes 192.168.1.0/24, 192.168.2.0/24, 192.168.3.0/24). Based on prefix distribution list 108, table generator 121 determines that prefix block 301 should comprise of 200 entries, and thus, reserves 197 blank entries for future insertions of prefixes with the length of 24. Further, table generator 121 determines that there are currently 2 prefixes with the length of 16 (i.e., prefixes 192.11.0.0/16, 192.12.0.0/16). Based on prefix distribution list 108, table generator 121 determines that prefix block 302 should comprise of 10 entries, and thus, reserves 8 blank entries for future insertions of prefixes with the length of 16. Thus, contrary to a conventional forwarding plane, table generator 121 is able to determine precisely how many blank entries to reserve for each prefix length. In this way, the update performance of prefix blocks 301 and 302 can be optimized without wasting memory.

An example of a lookup process utilizing prefix blocks 301-302 will now be described. Assume that network device 103 receives a packet with a source IP address 192.168.1.100, and that network device 103 must search for this source IP address in prefix blocks 301-302. In this example, network device 103 determines that the source IP address of the incoming packet matches the first entry of prefix block 301. The located prefix entry typically maps to information/characteristics associated with the input key. For example, in the case where prefix blocks 301-302 implement a FIB, the first entry of prefix block 301 can map to an output port, so that input traffic with the source IP address 192.168.1.100 is forwarded to the identified output port. By way of further example, in the case where prefix blocks 301-302 implement an ACL, the first entry of prefix block 301 can map to an action to be performed on the packet.

The number of blank entries reserved for prefix blocks 301-302 shown in FIG. 3 is for illustrative purposes, and not intended to be limitations of the present invention. For example, in cases where network device 103 does not have sufficient memory, it may allocate less reserved entries than specified in prefix distribution list 108.

Referring again back to FIG. 1. In one embodiment, table generator 121 generates rule blocks 125 based on priority distribution list 118. For example, rule blocks 125 may implement an ACL table. Rule blocks 125, however, can implement a lookup table for any function. According to one embodiment, rule blocks 125 is implemented in a TCAM. In such an embodiment, rule blocks 125 represents one or more blocks of rule entries, wherein each of the blocks is associated with a priority included in priority distribution list 118. Thus, the rules stored in the entries of each block have the same priority. In one embodiment, not all of the entries in each block are used. For example, some of the entries may store rules while others are blank entries reserved for future insertions of rules. In one embodiment, table generator 121 determines the number of blank entries to include in a block based on the rule count included in priority distribution list 118 corresponding to the priority of the block.

Figure 4:
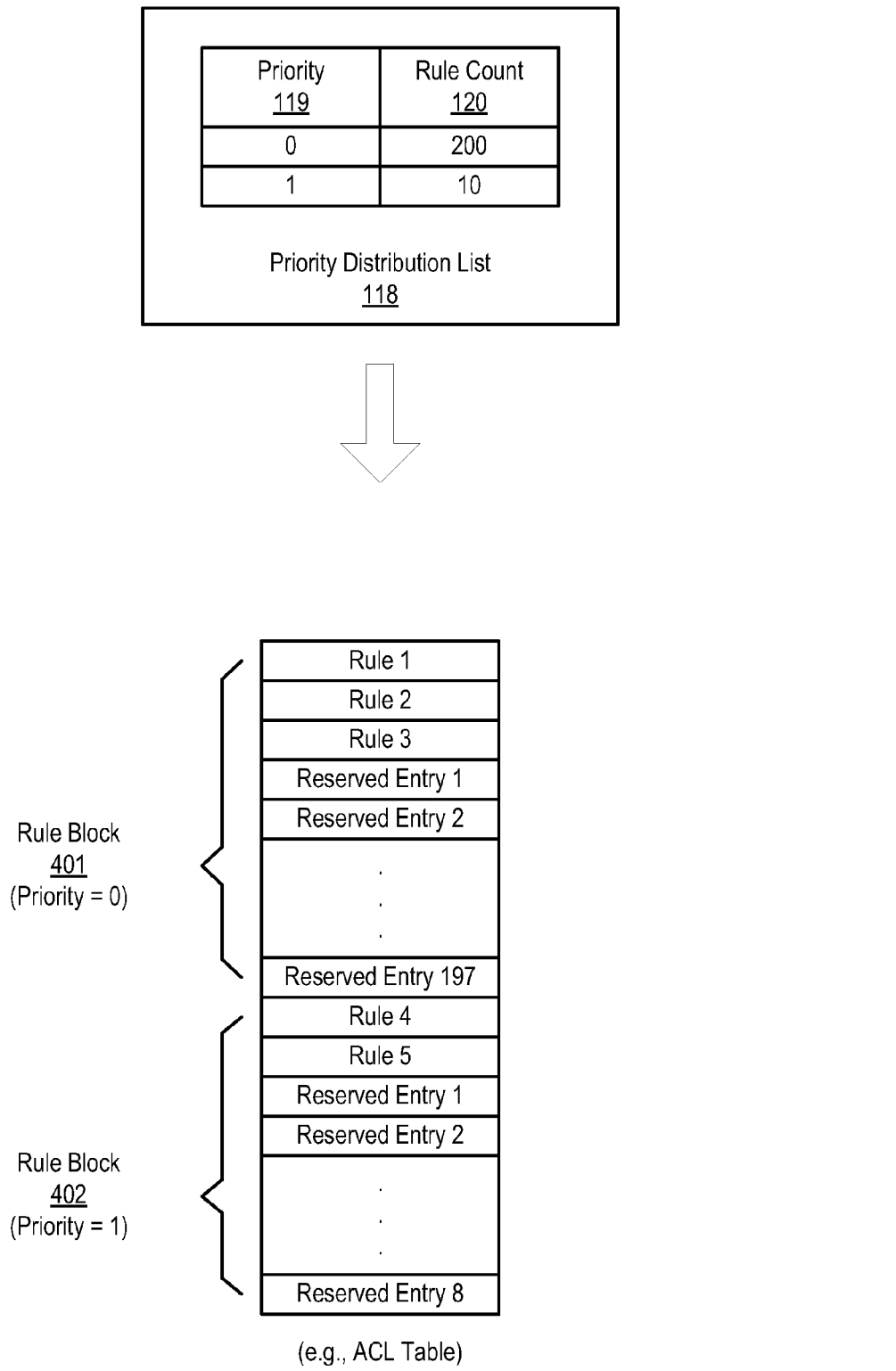
FIG. 4 is a block diagram illustrating a mechanism for generating rule blocks with reserved blank entries in a TCAM based on priority distribution information according to one embodiment.

FIG. 4 is block diagram illustrating table generator 121 generating rule blocks 401-402 based on priority distribution list 118 according to one embodiment. Referring now to the embodiment illustrated in FIG. 4, which assumes that table generator 121 has received priority distribution list 118 from distribution controller 111. Priority distribution list 118, in this example, includes a priority 0 with a corresponding rule count of 200, and a priority of 1 with a corresponding rule count of 10. Thus, priority distribution list 118 indicates that there are 200 rules having a priority of 0, and 10 rules having a priority of 1.

In one embodiment, based on the prefix distribution information, table generator 121 generates rule blocks 401 and 402. Rule block 401 is associated with the priority 0 included in priority distribution list 118, and thus, entries of the block either contain rules having the priority 0, or are left blank and reserved for future insertions of rules of priority 0. Rule block 402 is associated with the priority 1 included in priority distribution list 118, and thus, entries of the block either contain rules of priority 1, or are left blank and reserved for future insertions of rules of priority 1.

In this example, table generator 121 determines that there are currently 3 rules with priority 0 (i.e., rule 1, rule 2, and rule 3). Based on priority distribution list 118, table generator 121 determines that rule block 401 should comprise of 200 entries, and thus, reserves 197 blank entries for future insertions of rules with priority 0. Further, table generator 121 determines that there are currently 2 rules with priority 1 (i.e., rule 4 and rule 5). Based on priority distribution list 118, table generator 121 determines that rule block 402 should comprise of 10 entries, and thus, reserves 8 blank entries for future insertions of rules with priority 1. Thus, contrary to a conventional forwarding plane, table generator 121 is able to determine precisely how many blank entries to reserve for each priority. In this way, the update performance of rule blocks 401 and 402 can be optimized without wasting memory.

An example of a lookup process utilizing rule blocks 401-402 will now be described. Assume that each rule comprises of the source IP prefix, destination IP prefix, source MAC address, and destination MAC address. Assume further that Rule 1=192.168.1.*.10.100.*1*:*:*:*:*:*:*:*:*:*:*:*:*
and
Rule 4=*.*.*.*.*.*.*.*.*:*:*:*:*:*:11:12:13:14:15:16.

In this example, rule 1 maps to a "deny" action, and rule 4 maps to a "permit" action. Assume further that the incoming packet has a source IP address of 192.168.1.100, destination IP address of 10.100.1.5, source MAC address of 01.02.03.04.05.06, and destination MAC address of 11.12.13.14.15.16. Thus, the incoming packet has a key of "192.168.1.100.10.100.1.5.01.02.03.04.05.06.11.12.13.14.15.16". This key matches both rule 1 of rule block 401 and rule 4 of rule block 402. However, rule 1 has a higher priority, so the "deny" action is applied and the "permit" action is ignored. Thus, the incoming packet is dropped.

The number of blank entries reserved for rule blocks 401-402 shown in FIG. 4 is for illustrative purposes, and not intended to be limitations of the present invention. For example, in cases where network device 103 does not have sufficient memory, it may allocate less reserved entries than specified in priority distribution list 118.

Throughout the description, table generator 121 is described as generating trie trees (e.g., trie tree 122), prefix blocks (e.g., prefix blocks 123), rule blocks (e.g., rule blocks 125). The present invention, however, is not so limited. One having ordinary skill in the art would recognize that the present techniques apply equally to all other types of lookup table with parameters that can be configured based on prefix distribution list 108 and/or priority distribution list 118. For example, table generator 121 can utilize prefix distribution list 108 and/or priority distribution list 118 to generate other forwarding tables 124.

The mechanisms for providing prefix distribution and priority distribution information to a forwarding plane have been described with respect to network device 101. It shall be understood that the mechanisms can be implemented in any network device of control plane 105. Further, the mechanisms for generating forwarding tables based on the prefix distribution and priority distribution information are not limited to network device 103. One with ordinary skill in the art would recognize that the mechanisms can be implemented in any network device of forwarding plane 106.

FIG. 5 is a flow diagram illustrating a method for generating forwarding tables based on prefix distribution information, according to one embodiment. For example, method 500 can be implemented by control plane 105 (e.g., distribution controller 111 of network device 101 of control plane 105) and forwarding plane 106 (e.g., table generator 121 of network device 103 of forwarding plane 106). Method 500 can be implemented in software, firmware, hardware, or any combination thereof. The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Referring now to FIG. 5. At block 505, the distribution controller determines an IP prefix count corresponding to each of a plurality of IP prefix lengths, wherein the IP prefix count identifies a total number of IP prefixes of each corresponding IP prefix length. For example, the distribution controller determines that there are 200 prefixes having a prefix length of 24, and 10 prefixes having a prefix length of 16 (as illustrated in FIGS. 2-3).

At block 510, the distribution controller generates a prefix distribution list comprising of the plurality of IP prefix lengths and the corresponding IP prefix counts. For example, the distribution controller generates prefix distribution list 108 which includes prefix lengths 24 and 16, with corresponding prefix counts of 200 and 10, respectively. At block 515, the distribution controller sends the prefix distribution list to a forwarding plane. For example, the distribution controller sends prefix distribution list 108 to network device 103 of forwarding plane 106. At block 520, in response to receiving the prefix distribution list, the table generator selects a type of forwarding table to generate.

At block 525, the table generator generates a trie tree comprising of multiple levels, wherein a stride of each level is determined based on the IP prefix lengths and IP prefix counts included in the IP prefix distribution list. For example, the table generator generates trie tree 122 having 2 levels, wherein the stride of the first level is 24 because prefix distribution list 108 indicates that most of the prefixes (200 out of 210) have a prefix length of 24.

At block 530, the table generator generates blocks of IP prefix entries, wherein each block is associated with one IP prefix length included in the IP prefix distribution list, wherein at least one block includes a number of reserved entries determined based on an IP prefix count corresponding to an IP prefix length associated with the at least one block. For example, the table generator generates prefix blocks 301 and 302, wherein prefix block 301 is associated with prefix length 24 included in prefix distribution list 108, and prefix block 302 is associated with prefix length 16 included in prefix distribution list 108. By way of further example, the table generator determines that prefix block 301 should include 197 reserved entries because prefix distribution list 108 indicates that prefix length 24 includes 200 prefixes, and there are only 3 prefixes with a prefix length of 24 currently in use.

FIG. 6 is a flow diagram illustrating a method for generating forwarding tables based on priority distribution information, according to one embodiment. For example, method 600 can be implemented by control plane 105 (e.g., distribution controller 111 of network device 101 of control plane 105) and forwarding plane 106 (e.g., table generator 121 of network device 103 of forwarding plane 106). Method 600 can be implemented in software, firmware, hardware, or any combination thereof.

Referring now to FIG. 6. At block 605, the distribution controller determines a rule count corresponding to each of a plurality of priorities, wherein the rule count identifies a total number of rules of each corresponding priority. For example, the distribution controller determines that there are 200 rules having a priority of 0, and 10 rules having a priority of 1 (as illustrated in FIG. 4).

At block 610, the distribution controller generates a priority distribution list comprising of the plurality of priorities and the corresponding rule counts. For example, the distribution controller generates priority distribution list 118 which includes priorities 0 and 1, with corresponding rule counts of 200 and 10, respectively. At block 615, the distribution controller sends the priority distribution list to a forwarding plane. For example, the distribution controller sends priority distribution list 118 to network device 103 of forwarding plane 106. At block 620, in response to receiving the priority distribution list, the table generator selects a type of forwarding table to generate.

At block 625, the table generator generates blocks of rule entries, wherein each block is associated with one priority included in the priority distribution list, wherein at least one block includes a number of reserved entries determined based on a rule count corresponding to a priority associated with the at least one block. For example, the table generator generates rule blocks 401 and 402, wherein rule block 401 is associated with priority 0 included in priority distribution list 118, and rule block 402 is associated with priority 1 included in priority distribution list 118. By way of further example, the table generator determines that rule block 401 should include 197 reserved entries because priority distribution list 118 indicates that priority 0 includes 200 rules, and there are only 3 rules with a priority of 0 currently in use. In one embodiment, the blocks of rule entries (e.g., rule blocks 401 and 402) implement an ACL table.

An electronic device or a computing device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

FIG. 7A illustrates connectivity between network devices (NDs) within an exemplary network, as well as three exemplary implementations of the NDs, according to some embodiments of the invention. FIG. 7A shows NDs 700A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 700A, E, and F illustrates that these NDs act as ingress and egress points for the network (and thus, these NDs are sometimes referred to as edge NDs; while the other NDs may be called core NDs).

Two of the exemplary ND implementations in FIG. 7A are: 1) a special-purpose network device 702 that uses custom application-specific integrated-circuits (ASICs) and a proprietary operating system (OS); and 2) a general purpose network device 704 that uses common off-the-shelf (COTS) processors and a standard OS.

The special-purpose network device 702 includes networking hardware 710 comprising compute resource(s) 712 (which typically include a set of one or more processors), forwarding resource(s) 714 (which typically include one or more ASICs and/or network processors), and physical network interfaces (NIs) 716 (sometimes called physical ports), as well as non-transitory machine readable storage media 718 having stored therein networking software 720. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 700A-H. During operation, the networking software 720 may be executed by the networking hardware 710 to instantiate a set of one or more networking software instance(s) 722. Each of the networking software instance(s) 722, and that part of the networking hardware 710 that executes that network software instance (be it hardware dedicated to that networking software instance and/or time slices of hardware temporally shared by that networking software instance with others of the networking software instance(s) 722), form a separate virtual network element 730A-R. Each of the virtual network element(s) (VNEs) 730A-R includes a control communication and configuration module 732A-R (sometimes referred to as a local control module or control communication module) and forwarding table(s) 734A-R, such that a given virtual network element (e.g., 730A) includes the control communication and configuration module (e.g., 732A), a set of one or more forwarding table(s) (e.g., 734A), and that portion of the networking hardware 710 that executes the virtual network element (e.g., 730A).

The special-purpose network device 702 is often physically and/or logically considered to include: 1) a ND control plane 724 (sometimes referred to as a control plane) comprising the compute resource(s) 712 that execute the control communication and configuration module(s) 732A-R; and 2) a ND forwarding plane 726 (sometimes referred to as a forwarding plane, a data plane, or a media plane) comprising the forwarding resource(s) 714 that utilize the forwarding table(s) 734A-R and the physical NIs 716. By way of example, where the ND is a router (or is implementing routing functionality), the ND control plane 724 (the compute resource(s) 712 executing the control communication and configuration module(s) 732A-R) is typically responsible for participating in controlling how data (e.g., packets) is to be routed (e.g., the next hop for the data and the outgoing physical NI for that data) and storing that routing information in the forwarding table(s) 734A-R, and the ND forwarding plane 726 is responsible for receiving that data on the physical NIs 716 and forwarding that data out the appropriate ones of the physical NIs 716 based on the forwarding table(s) 734A-R.

According to one embodiment, one or more of control communication and configuration module(s) 732A-R include a distribution controller for performing operations similar to those performed by distribution controller 111. For example, control communication and configuration module 732A includes distribution controller 735A for performing operations similar to those performed by distribution controller 111. According to one embodiment, one or more of network element(s) 730A-R includes a table generator for performing operations similar to those performed by table generator 121. For example, network element 730A includes table generator 737A for performing operations similar to those performed by table generator 121.

FIG. 7B illustrates an exemplary way to implement the special-purpose network device 702 according to some embodiments of the invention. FIG. 7B shows a special-purpose network device including cards 738 (typically hot pluggable). While in some embodiments the cards 738 are of two types (one or more that operate as the ND forwarding plane 726 (sometimes called line cards), and one or more that operate to implement the ND control plane 724 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 736 (e.g., a first full mesh coupling the line cards and a second full mesh coupling all of the cards).

Returning to FIG. 7A, the general purpose network device 704 includes hardware 740 comprising a set of one or more processor(s) 742 (which are often COTS processors) and network interface controller(s) 744 (NICs; also known as network interface cards) (which include physical NIs 746), as well as non-transitory machine readable storage media 748 having stored therein software 750. During operation, the processor(s) 742 execute the software 750 to instantiate a hypervisor 754 (sometimes referred to as a virtual machine monitor (VMM)) and one or more virtual machines 762A-R that are run by the hypervisor 754, which are collectively referred to as software instance(s) 752. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 762A-R, and that part of the hardware 740 that executes that virtual machine (be it hardware dedicated to that virtual machine and/or time slices of hardware temporally shared by that virtual machine with others of the virtual machine(s) 762A-R), forms a separate virtual network element(s) 760A-R.

The virtual network element(s) 760A-R perform similar functionality to the virtual network element(s) 730A-R. For instance, the hypervisor 754 may present a virtual operating platform that appears like networking hardware 710 to virtual machine 762A, and the virtual machine 762A may be used to implement functionality similar to the control communication and configuration module(s) 732A and forwarding table(s) 734A (this virtualization of the hardware 740 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the virtual machine(s) 762A-R differently. For example, while embodiments of the invention are illustrated with each virtual machine 762A-R corresponding to one VNE 760A-R, alternative embodiments may implement this correspondence at a finer level granularity (e.g., line card virtual machines virtualize line cards, control card virtual machine virtualize control cards, etc.); it should be understood that the techniques described herein with reference to a correspondence of virtual machines to VNEs also apply to embodiments where such a finer level of granularity is used.

In certain embodiments, the hypervisor 754 includes a virtual switch that provides similar forwarding services as a physical Ethernet switch. Specifically, this virtual switch forwards traffic between virtual machines and the NIC(s) 744, as well as optionally between the virtual machines 762A-R; in addition, this virtual switch may enforce network isolation between the VNEs 760A-R that by policy are not permitted to communicate with each other (e.g., by honoring virtual local area networks (VLANs)).

According to one embodiment, one or more of virtual machines 762A-R includes a distribution controller for performing operations similar to those performed by distribution controller 111. For example, virtual machine 762A includes distribution controller 763A for performing operations similar to those performed by distribution controller 111. According to one embodiment, one or more of virtual machines 762A-R includes a table generator for performing operations similar to those performed by table generator 121. For example, virtual machine 762A includes table generator 764A for performing operations similar to those performed by table generator 121.

The third exemplary ND implementation in FIG. 7A is a hybrid network device 706, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 702) could provide for para-virtualization to the networking hardware present in the hybrid network device 706.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 730A-R, VNEs 760A-R, and those in the hybrid network device 706) receives data on the physical NIs (e.g., 716, 746) and forwards that data out the appropriate ones of the physical NIs (e.g., 716, 746). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

FIG. 7C illustrates various exemplary ways in which VNEs may be coupled according to some embodiments of the invention. FIG. 7C shows VNEs 770A.1-770A.P (and optionally VNEs 770A.Q-770A.R) implemented in ND 700A and VNE 770H.1 in ND 700H. In FIG. 7C, VNEs 770A.1-P are separate from each other in the sense that they can receive packets from outside ND 700A and forward packets outside of ND 700A; VNE 770A.1 is coupled with VNE 770H.1, and thus they communicate packets between their respective NDs; VNE 770A.2-770A.3 may optionally forward packets between themselves without forwarding them outside of the ND 700A; and VNE 770A.P may optionally be the first in a chain of VNEs that includes VNE 770A.Q followed by VNE 770A.R (this is sometimes referred to as dynamic service chaining, where each of the VNEs in the series of VNEs provides a different service— e.g., one or more layer 4-7 network services). While FIG. 7C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 7A, for example, may form part of the Internet or a private network; and other electronic devices (not shown; such as end user devices including workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 7A may also host one or more such servers (e.g., in the case of the general purpose network device 704, one or more of the virtual machines 762A-R may operate as servers; the same would be true for the hybrid network device 706; in the case of the special-purpose network device 702, one or more such servers could also be run on a hypervisor executed by the compute resource(s) 712); in which case the servers are said to be co-located with the VNEs of that ND.

A virtual network is a logical abstraction of a physical network (such as that in FIG. 7A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

FIG. 7D illustrates a network with a single network element on each of the NDs of FIG. 7A, and within this straight forward approach contrasts a traditional distributed approach (commonly used by traditional routers) with a centralized approach for maintaining reachability and forwarding information (also called network control), according to some embodiments of the invention. Specifically, FIG. 7D illustrates network elements (NEs) 770A-H with the same connectivity as the NDs 700A-H of FIG. 7A.

FIG. 7D illustrates that the distributed approach 772 distributes responsibility for generating the reachability and forwarding information across the NEs 770A-H; in other words, the process of neighbor discovery and topology discovery is distributed.

For example, where the special-purpose network device 702 is used, the control communication and configuration module(s) 732A-R of the ND control plane 724 typically include a reachability and forwarding information module to implement one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other NEs to exchange routes, and then selects those routes based on one or more routing metrics. Thus, the NEs 770A-H (e.g., the compute resource(s) 712 executing the control communication and configuration module(s) 732A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 724. The ND control plane 724 programs the ND forwarding plane 726 with information (e.g., adjacency and route information) based on the routing structure(s). For example, the ND control plane 724 programs the adjacency and route information into one or more forwarding table(s) 734A-R (e.g., Forwarding Information Base (FIB), Label Forwarding Information Base (LFIB), and one or more adjacency structures) on the ND forwarding plane 726. For layer 2 forwarding, the ND can store one or more bridging tables that are used to forward data based on the layer 2 information in that data. While the above example uses the special-purpose network device 702, the same distributed approach 772 can be implemented on the general purpose network device 704 and the hybrid network device 706.

FIG. 7D illustrates that a centralized approach 774 (also known as software defined networking (SDN)) that decouples the system that makes decisions about where traffic is sent from the underlying systems that forwards traffic to the selected destination. The illustrated centralized approach 774 has the responsibility for the generation of reachability and forwarding information in a centralized control plane 776 (sometimes referred to as a SDN control module, controller, network controller, SDN controller, control plane node, network virtualization authority, or management control entity), and thus the process of neighbor discovery and topology discovery is centralized. The centralized control plane 776 has a south bound interface 782 with a data plane 780 (sometime referred to the infrastructure layer, network forwarding plane, or forwarding plane (which should not be confused with a ND forwarding plane)) that includes the NEs 770A-H (sometimes referred to as switches, forwarding elements, data plane elements, or nodes). The centralized control plane 776 includes a network controller 778, which includes a centralized reachability and forwarding information module 779 that determines the reachability within the network and distributes the forwarding information to the NEs 770A-H of the data plane 780 over the south bound interface 782. Thus, the network intelligence is centralized in the centralized control plane 776 executing on electronic devices that are typically separate from the NDs.

For example, where the special-purpose network device 702 is used in the data plane 780, each of the control communication and configuration module(s) 732A-R of the ND control plane 724 typically include a control agent that provides the VNE side of the south bound interface 782. In this case, the ND control plane 724 (the compute resource(s) 712 executing the control communication and configuration module(s) 732A-R) performs its responsibility for participating in controlling how data (e.g., packets) is to be routed (e.g., the next hop for the data and the outgoing physical NI for that data) through the control agent communicating with the centralized control plane 776 to receive the forwarding information (and in some cases, the reachability information) from the centralized reachability and forwarding information module 779 (it should be understood that in some embodiments of the invention, the control communication and configuration module(s) 732A-R, in addition to communicating with the centralized control plane 776, may also play some role in determining reachability and/or calculating forwarding information—albeit less so than in the case of a distributed approach; such embodiments are generally considered to fall under the centralized approach 774, but may also be considered a hybrid approach). According to one embodiment, centralized reachability and forwarding information module 779 includes distribution controller 781 for performing operations similar to those performed by distribution controller 111.

While the above example uses the special-purpose network device 702, the same centralized approach 774 can be implemented with the general purpose network device 704 (e.g., each of the VNE 760A-R performs its responsibility for controlling how data (e.g., packets) is to be routed (e.g., the next hop for the data and the outgoing physical NI for that data) by communicating with the centralized control plane 776 to receive the forwarding information (and in some cases, the reachability information) from the centralized reachability and forwarding information module 779; it should be understood that in some embodiments of the invention, the VNEs 760A-R, in addition to communicating with the centralized control plane 776, may also play some role in determining reachability and/or calculating forwarding information—albeit less so than in the case of a distributed approach) and the hybrid network device 706. In fact, the use of SDN techniques can enhance the NFV techniques typically used in the general purpose network device 704 or hybrid network device 706 implementations as NFV is able to support SDN by providing an infrastructure upon which the SDN software can be run, and NFV and SDN both aim to make use of commodity server hardware and physical switches.

FIG. 7D also shows that the centralized control plane 776 has a north bound interface 784 to an application layer 786, in which resides application(s) 788. The centralized control plane 776 has the ability to form virtual networks 792 (sometimes referred to as a logical forwarding plane, network services, or overlay networks (with the NEs 770A-H of the data plane 780 being the underlay network)) for the application(s) 788. Thus, the centralized control plane 776 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 7D shows the distributed approach 772 separate from the centralized approach 774, the effort of network control may be distributed differently or the two combined in certain embodiments of the invention. For example: 1) embodiments may generally use the centralized approach (SDN) 774, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 774, but may also be considered a hybrid approach.

While FIG. 7D illustrates the simple case where each of the NDs 700A-H implements a single NE 770A-H, it should be understood that the network control approaches described with reference to FIG. 7D also work for networks where one or more of the NDs 700A-H implement multiple VNEs (e.g., VNEs 730A-R, VNEs 760A-R, those in the hybrid network device 706). Alternatively or in addition, the network controller 778 may also emulate the implementation of multiple VNEs in a single ND. Specifically, instead of (or in addition to) implementing multiple VNEs in a single ND, the network controller 778 may present the implementation of a VNE/NE in a single ND as multiple VNEs in the virtual networks 792 (all in the same one of the virtual network(s) 792, each in different ones of the virtual network(s) 792, or some combination). For example, the network controller 778 may cause an ND to implement a single VNE (a NE) in the underlay network, and then logically divide up the resources of that NE within the centralized control plane 776 to present different VNEs in the virtual network(s) 792 (where these different VNEs in the overlay networks are sharing the resources of the single VNE/NE implementation on the ND in the underlay network).

According to one embodiment, one or more of NE 770A-H includes a table generator for performing operations similar to those performed by table generator 121. For example, NE 770E includes table generator 783 for performing operations similar to those performed by table generator 121.

On the other hand, FIGS. 7E and 7F respectively illustrate exemplary abstractions of NEs and VNEs that the network controller 778 may present as part of different ones of the virtual networks 792. FIG. 7E illustrates the simple case of where each of the NDs 700A-H implements a single NE 770A-H (see FIG. 7D), but the centralized control plane 776 has abstracted multiple of the NEs in different NDs (the NEs 770A-C and G-H) into (to represent) a single NE 7701 in one of the virtual network(s) 792 of FIG. 7D, according to some embodiments of the invention. FIG. 7E shows that in this virtual network, the NE 7701 is coupled to NE 770D and 770F, which are both still coupled to NE 770E.

FIG. 7F illustrates a case where multiple VNEs (VNE 770A.1 and VNE 770H.1) are implemented on different NDs (ND 700A and ND 700H) and are coupled to each other, and where the centralized control plane 776 has abstracted these multiple VNEs such that they appear as a single VNE 770T within one of the virtual networks 792 of FIG. 7D, according to some embodiments of the invention. Thus, the abstraction of a NE or VNE can span multiple NDs.

While some embodiments of the invention implement the centralized control plane 776 as a single entity (e.g., a single instance of software running on a single electronic device), alternative embodiments may spread the functionality across multiple entities for redundancy and/or scalability purposes (e.g., multiple instances of software running on different electronic devices).

Figure 8:
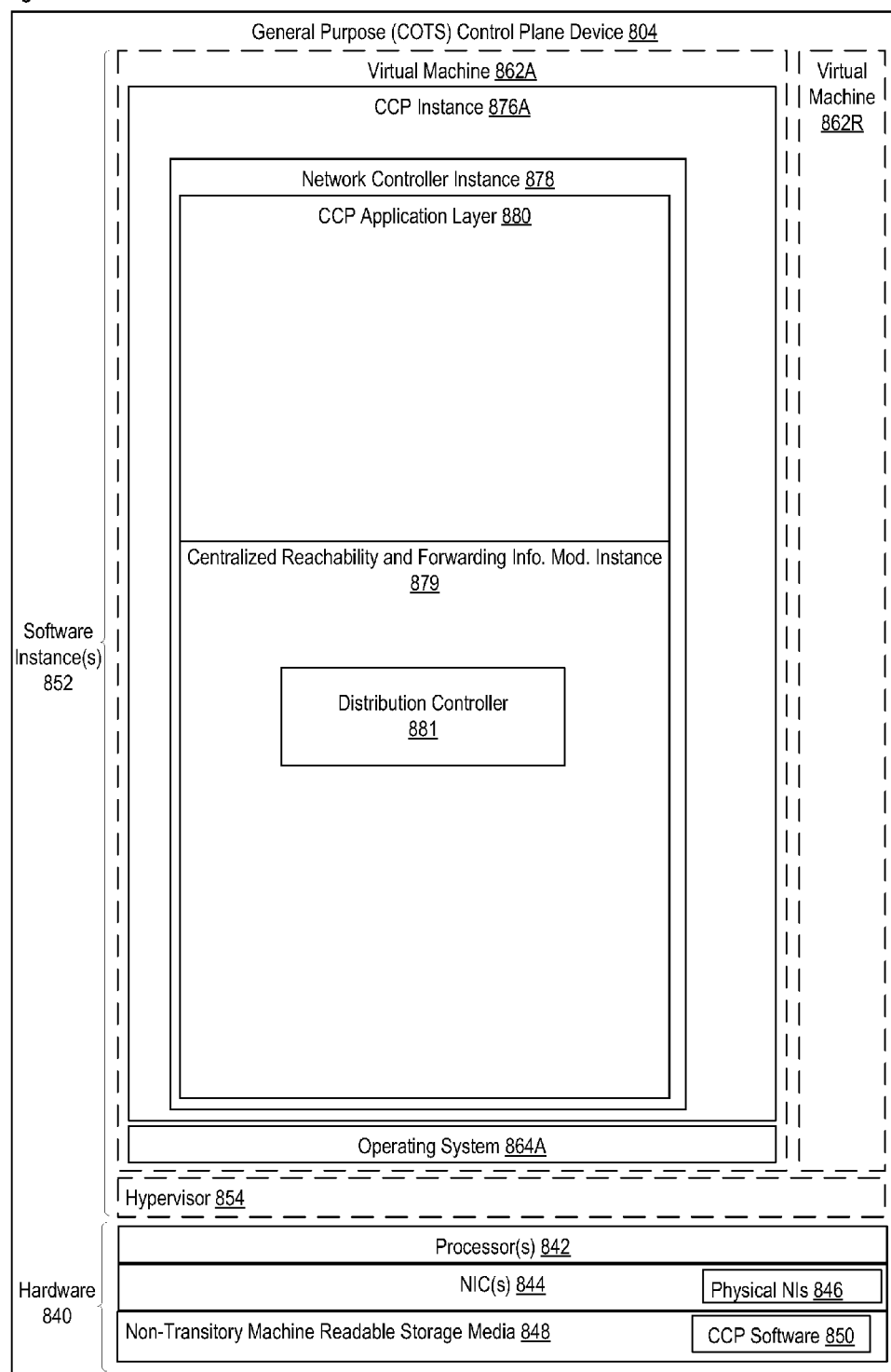
FIG. 8 illustrates a general purpose control plane device 804 including hardware 840 comprising a set of one or more processor(s) 842 (which are often Commercial off-the-shelf (COTS) processors) and network interface controller(s) 844 (NICs; also known as network interface cards) (which include physical NIs 846), as well as non-transitory machine readable storage media 848 having stored therein centralized control plane (CCP) software 850), according to some embodiments of the invention.

Similar to the network device implementations, the electronic device(s) running the centralized control plane 776, and thus the network controller 778 including the centralized reachability and forwarding information module 779, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 8 illustrates, a general purpose control plane device 804 including hardware 840 comprising a set of one or more processor(s) 842 (which are often COTS processors) and network interface controller(s) 844 (NICs; also known as network interface cards) (which include physical NIs 846), as well as non-transitory machine readable storage media 848 having stored therein centralized control plane (CCP) software 850.

In embodiments that use compute virtualization, the processor(s) 842 typically execute software to instantiate a hypervisor 854 (sometimes referred to as a virtual machine monitor (VMM)) and one or more virtual machines 862A-R that are run by the hypervisor 854; which are collectively referred to as software instance(s) 852. A virtual machine is a software implementation of a physical machine that runs programs as if they were executing on a physical, non-virtualized machine; and applications generally are not aware they are running on a virtual machine as opposed to running on a "bare metal" host electronic device, though some systems provide para-virtualization which allows an operating system or application to be aware of the presence of virtualization for optimization purposes. Again, in embodiments where compute virtualization is used, during operation an instance of the CCP software 850 (illustrated as CCP instance 876A) on top of an operating system 864A are typically executed within the virtual machine 862A. In embodiments where compute virtualization is not used, the CCP instance 876A on top of operating system 864A is executed on the "bare metal" general purpose control plane device 804.

The operating system 864A provides basic processing, input/output (I/O), and networking capabilities. In some embodiments, the CCP instance 876A includes a network controller instance 878. The network controller instance 878 includes a centralized reachability and forwarding information module instance 879 (which is a middleware layer providing the context of the network controller 778 to the operating system 864A and communicating with the various NEs), and an CCP application layer 880 (sometimes referred to as an application layer) over the middleware layer (providing the intelligence required for various network operations such as protocols, network situational awareness, and user—interfaces). At a more abstract level, this CCP application layer 880 within the centralized control plane 776 works with virtual network view(s) (logical view(s) of the network) and the middleware layer provides the conversion from the virtual networks to the physical view. According to one embodiment, centralized reachability and forwarding information module instance 879 includes distribution controller 881 for performing operations similar to those performed by distribution controller 111.

The centralized control plane 776 transmits relevant messages to the data plane 780 based on CCP application layer 880 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 780 may receive different messages, and thus different forwarding information. The data plane 780 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Various standards known in the art define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss") arrives at the data plane 780, the packet (or a subset of the packet header and content) is typically forwarded to the centralized control plane 776. The centralized control plane 776 will then program forwarding table entries into the data plane 780 to accommodate packets belonging to the flow of the unknown packet. Once a specific forwarding table entry has been programmed into the data plane 780 by the centralized control plane 776, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A method in a first network device operating in a control plane for sending Internet Protocol (IP) prefix distribution information to a second network device operating in a forwarding plane, the method comprising:
generating an IP prefix distribution list comprising a plurality of IP prefix lengths and corresponding IP prefix counts, wherein each IP prefix count identifies a total number of IP prefixes of each corresponding IP prefix length of the plurality of IP prefix lengths;
sending the IP prefix distribution list to the second network device, wherein the IP prefix distribution list causes the second network device to generate an IP forwarding table based on the plurality of IP prefix lengths and the corresponding IP prefix counts included in the IP prefix distribution list,
wherein the IP prefix distribution list causes the second network device to generate the IP forwarding table that includes a plurality of blocks of IP prefix entries, wherein each block of the plurality of blocks of the IP prefix entries is associated with one IP prefix length included in the IP prefix distribution list, wherein at least one block of the plurality of blocks of the IP prefix entries includes a number of reserved entries, and wherein the number of reserved entries is determined based on an IP prefix count corresponding to an IP prefix length associated with the at least one block;
generating a priority distribution list comprising a plurality of priorities and corresponding rule counts, wherein each rule count identifies a total number of rules of each corresponding priority; and
sending the priority distribution list to the second network device, wherein the priority distribution list causes the second network device to generate an access control list (ACL) table based on the plurality of priorities and the corresponding rule counts included in the priority distribution list, wherein the ACL table comprises a plurality of blocks of rule entries, wherein each rule entry comprises a source IP prefix, a destination IP prefix, and a corresponding action mapped to a rule of the rule entry, and wherein the second network device searches the source IP prefix in the IP forwarding table to perform the corresponding action mapped to the rule.

2. The method of claim 1, wherein each block of the plurality of blocks of the rule entries is associated with one priority included in the priority distribution list, wherein at least one block of the plurality of blocks of the rule entries includes a number of reserved entries, and wherein the number of reserved entries, included in the at least one block of the plurality of blocks of the rule entries, is determined based on a rule count corresponding to a priority associated with the at least one block.

3. A first network device operating in a control plane for sending Internet Protocol (IP) prefix distribution information to a second network device operating in a forwarding plane, the first network device comprising:
a set of one or more processors; and
a non-transitory machine-readable storage medium containing code, which when executed by the set of one or more processors, causes the first network device to:
determine an IP prefix count for each IP prefix length of a plurality of IP prefix lengths, wherein the IP prefix count identifies a total number of IP prefixes for each IP prefix length of the plurality of IP prefix lengths,
generate an IP prefix distribution list comprising the plurality of IP prefix lengths and corresponding IP prefix counts, determine a type of an IP forwarding table to be generated, based on the IP prefix distribution list,
send the IP prefix distribution list and the type of the IP forwarding table to the second network device, wherein the IP prefix distribution list and the type of the IP forwarding table cause the second network device to generate the IP forwarding table based on the plurality of IP prefix lengths and the corresponding IP prefix counts included in the IP prefix distribution list,
generate a priority distribution list comprising a plurality of priorities and corresponding rule counts, wherein each rule count identifies a total number of rules of each corresponding priority, and
send the priority distribution list to the second network device.

4. The first network device of claim 3, wherein the IP prefix distribution list causes the second network device to generate a trie tree comprising a plurality of levels based on the type of the IP forwarding table, and wherein a stride of each level of the trie tree is determined based on the plurality of IP prefix lengths and the corresponding IP prefix counts included in the IP prefix distribution list.

5. The first network device of claim 4, wherein the stride of each level of the trie tree is determined based on the IP prefix length corresponding to the IP prefix count in the IP prefix distribution list.

6. The first network device of claim 3,
wherein the priority distribution list causes the second network device to generate an access control list (ACL)

table based on the plurality of priorities and the corresponding rule counts included in the priority distribution list.

7. The first network device of claim 6, wherein the priority distribution list causes the second network device to generate the ACL table that includes a plurality of blocks of rule entries, wherein each block of the rule entries is associated with one priority included in the priority distribution list, wherein at least one block of the plurality of blocks of the rule entries includes a number of reserved entries, and wherein the number of reserved entries is determined based on a rule count corresponding to a priority associated with the at least one block.

8. A non-transitory computer-readable storage medium having computer code stored therein, which when executed by a processor of a first network device operating in a control plane for sending Internet Protocol (IP) prefix distribution information to a second network device operating in a forwarding plane, causes the first network device to perform operations comprising:
  generating an IP prefix distribution list comprising a plurality of IP prefix lengths and corresponding IP prefix counts, wherein each IP prefix count identifies a total number of IP prefixes of each corresponding IP prefix length of the plurality of IP prefix lengths;
  sending the IP prefix distribution list to the second network device, wherein the IP prefix distribution list causes the second network device to generate an IP forwarding table based on the plurality of IP prefix lengths and the corresponding IP prefix counts included in the IP prefix distribution list,
  wherein the IP prefix distribution list causes the second network device to generate the IP forwarding table that includes a plurality of blocks of IP prefix entries, wherein each block of the IP prefix entries is associated with one IP prefix length included in the IP prefix distribution list, wherein at least one block of the plurality of blocks of the IP prefix entries includes a number of reserved entries, and wherein the number of reserved entries is determined based on an IP prefix count corresponding to an IP prefix length associated with the at least one block;
  generating a priority distribution list comprising a plurality of priorities and corresponding rule counts, wherein each rule count identifies a total number of rules of each corresponding priority; and
  sending the priority distribution list to the second network device, wherein the priority distribution list causes the second network device to generate an access control list (ACL) table based on the plurality of priorities and the corresponding rule counts included in the priority distribution list, wherein the ACL table comprises a plurality of blocks of rule entries, wherein each rule entry comprises a source IP prefix, a destination IP prefix, and a corresponding action mapped to a rule of the rule entry, and wherein the second network device searches the source IP prefix in the IP forwarding table to perform the corresponding action mapped to the rule.

9. The non-transitory computer-readable storage medium of claim 8, wherein each block of the plurality of blocks of the rule entries is associated with one priority included in the priority distribution list, wherein at least one block of the plurality of blocks of the rule entries includes a number of reserved entries, and wherein the number of reserved entries, included in the at least one block of the plurality of blocks of the rule entries, is determined based on a rule count corresponding to a priority associated with the at least one block.

10. A method in a first network device operating in a forwarding plane for generating Internet Protocol (IP) forwarding tables based on IP prefix distribution information received from a second network device operating in a control plane, the method comprising:
  receiving an IP prefix distribution list from the second network device, wherein the IP prefix distribution list comprises a plurality of IP prefix lengths and corresponding IP prefix counts, and wherein each IP prefix count identifies a total number of IP prefixes of each corresponding IP prefix length of the plurality of IP prefix lengths;
  generating an IP forwarding table based on the plurality of IP prefix lengths and the corresponding IP prefix counts included in the IP prefix distribution list,
  wherein generating the IP forwarding table comprises generating a plurality of blocks of IP prefix entries, wherein each block of the plurality of blocks of the IP prefix entries is associated with one IP prefix length included in the IP prefix distribution list, wherein at least one block of the plurality of blocks of the IP prefix entries includes a number of reserved entries, and wherein the number of reserved entries is determined based on an IP prefix count corresponding to an IP prefix length associated with the at least one block;
  receiving a priority distribution list from the second network device, wherein the priority distribution list comprises a plurality of priorities and corresponding rule counts, wherein each rule count identifies a total number of rules of each corresponding priority; and
  generating an access control list (ACL) table based on the plurality of priorities and the corresponding rule counts included in the priority distribution list, wherein the ACL table comprises a plurality of blocks of rule entries, wherein each rule entry comprises a source IP prefix, a destination IP prefix, and a corresponding action mapped to a rule of the rule entry, and wherein the first network device searches the source IP prefix in the IP forwarding table to perform the corresponding action mapped to the rule.

11. The method of claim 10, wherein the plurality of blocks of the IP prefix entries are generated in a ternary content addressable memory (TCAM), and wherein the plurality of blocks of the IP prefix entries are contiguously located in the TCAM.

12. The method of claim 10, wherein each block of plurality of blocks of the rule entries is associated with one priority included in the priority distribution list, wherein at least one block of the plurality of blocks of the rule entries includes a number of reserved entries, and wherein the number of reserved entries, included in the at least one block of the plurality of blocks of the rule entries, is determined based on a rule count corresponding to a priority associated with the at least one block.

13. A first network device operating in a forwarding plane for generating Internet Protocol (IP) forwarding tables based on IP prefix distribution information received from a second network device operating in a control plane, the first network device comprising:
  a set of one or more processors; and
  a non-transitory machine-readable storage medium containing code, which when executed by the set of one or more processors, causes the first network device to:

receive an IP prefix distribution list from the second network device, the IP prefix distribution list comprising a plurality of IP prefix lengths and corresponding IP prefix counts, and wherein each IP prefix count identifies a total number of IP prefixes of each corresponding IP prefix length of the plurality of IP prefix lengths;

in response to receipt of the IP prefix distribution list, select a type of an IP forwarding table to be generated;

generate the IP forwarding table based on the plurality of IP prefix lengths and the corresponding IP prefix counts included in the IP prefix distribution list;

receive a priority distribution list from the second network device, wherein the priority distribution list comprises a plurality of priorities and corresponding rule counts, wherein each rule count identifies a total number of rules of each corresponding priority; and generate an access control list (ACL) table based on the plurality of priorities and the corresponding rule counts included in the priority distribution list, wherein the ACL table comprises a plurality of blocks of rule entries, wherein each rule entry comprises a source IP prefix, a destination IP prefix, and a corresponding action mapped to a rule of the rule entry, and wherein the first network device searches the source IP prefix in the IP forwarding table to perform the corresponding action mapped to the rule.

14. The first network device of claim 13, wherein the generation of the IP forwarding table comprises:

generation of a trie tree comprising a plurality of levels, wherein a stride of each level of the trie tree is determined based on the plurality of IP prefix lengths and the corresponding IP prefix counts included in the IP prefix distribution list.

15. The first network device of claim 14, wherein the stride of each level of the trie tree is determined based on the IP prefix length corresponding to the IP prefix count in the IP prefix distribution list.

16. The first network device of claim 13, wherein the generation of the IP forwarding table comprises generation of a plurality of blocks of IP prefix entries based on the type of the IP forwarding table, wherein the plurality of blocks of the IP prefix entries are generated in a ternary content addressable memory (TCAM), and wherein the plurality of blocks of the IP prefix entries are contiguously located in the TCAM.

17. The first network device of claim 13, wherein each block of the plurality of blocks of the rule entries is associated with one priority included in the priority distribution list, wherein at least one block of the plurality of blocks of the rule entries includes a number of reserved entries, and wherein the number of reserved entries is determined based on a rule count corresponding to a priority associated with the at least one block.

18. A non-transitory computer-readable storage medium having computer code stored therein, which when executed by a processor of a first network device operating in a forwarding plane for generating Internet Protocol (IP) forwarding tables based on IP prefix distribution information received from a second network device operating in a control plane, causes the first network device to perform operations comprising:

receiving an IP prefix distribution list from the second network device, the IP prefix distribution list comprising a plurality of IP prefix lengths and corresponding IP prefix counts, wherein each IP prefix count identifies a total number of IP prefixes of each corresponding IP prefix length of the plurality of IP prefix lengths;

generating an IP forwarding table based on the plurality of IP prefix lengths and the corresponding IP prefix counts included in the IP prefix distribution list, wherein generating the IP forwarding table comprises generating a plurality of blocks of IP prefix entries, wherein each block of the IP prefix entries is associated with one IP prefix length included in the IP prefix distribution list, wherein at least one block of the plurality of blocks of the IP prefix entries includes a number of reserved entries, and wherein the number of reserved entries is determined based on an IP prefix count corresponding to an IP prefix length associated with the at least one block;

receiving a priority distribution list from the second network device, the priority distribution list comprising a plurality of priorities and corresponding rule counts, wherein each rule count identifies a total number of rules of each corresponding priority; and generating an access control list (ACL) table based on the plurality of priorities and the corresponding rule counts included in the priority distribution list, wherein the ACL table comprises a plurality of blocks of rule entries, wherein each rule entry comprises a source IP prefix, a destination IP prefix, and a corresponding action mapped to a rule of the rule entry, and wherein the first network device searches the source IP prefix in the IP forwarding table to perform the corresponding action mapped to the rule.

19. The non-transitory computer-readable storage medium of claim 18, wherein the plurality of blocks of the IP prefix entries are generated in a ternary content addressable memory (TCAM), and wherein the plurality of blocks of the IP prefix entries are contiguously located in the TCAM.

20. The non-transitory computer-readable storage medium of claim 18, wherein each block of the plurality of blocks of the rule entries is associated with one priority included in the priority distribution list, wherein at least one block of the plurality of blocks of the rule entries includes a number of reserved entries, and wherein the number of reserved entries, included in the at least one block of the plurality of blocks of the rule entries, is determined based on a rule count corresponding to a priority associated with the at least one block.

21. A method in a virtual machine operating in a control plane for distributing Internet Protocol (IP) prefix information to a network device operating in a forwarding plane, the method comprising:

determining an IP prefix count for each IP prefix length of a plurality of IP prefix lengths, wherein the IP prefix count identifies a total number of IP prefixes for each IP prefix length of the plurality of IP prefix lengths;

generating an IP prefix distribution list comprising the plurality of IP prefix lengths and corresponding IP prefix counts;

determining a type of an IP forwarding table to be generated, based on the IP prefix distribution list;

sending the IP prefix distribution list and the type of the IP forwarding table, to the second network device, wherein the IP prefix distribution list and the type of the IP forwarding table cause the second network device to generate the IP forwarding table based on the plurality of IP prefix lengths and the corresponding IP prefix counts included in the IP prefix distribution list;

generating a priority distribution list comprising a plurality of priorities and corresponding rule counts, wherein each rule count identifies a total number of rules of each corresponding priority; and sending the priority distribution list to the second network device.

22. The method of claim 21, wherein the IP prefix distribution list causes the second network device to generate a trie tree comprising a plurality of levels based on the type of the IP forwarding table, and wherein a stride of each level of the trie tree is determined based on the plurality of IP prefix lengths and the corresponding IP prefix counts included in the IP prefix distribution list.

23. The method of claim 22, wherein the stride of each level of the trie tree is determined based on the IP prefix length corresponding to the IP prefix count in the IP prefix distribution list.

24. The method of claim 21,
wherein the priority distribution list causes the second network device to generate an access control list (ACL) table based on the plurality of priorities and the corresponding rule counts included in the priority distribution list.

25. The method of claim 24, wherein the priority distribution list causes the second network device to generate the ACL table that includes a plurality of blocks of rule entries, wherein each block of rule entries is associated with one priority included in the priority distribution list, wherein at least one block of the plurality of blocks of the rule entries includes a number of reserved entries, and wherein the number of reserved entries is determined based on a rule count corresponding to a priority associated with the at least one block.

26. The first network device of claim 3, wherein the IP prefix distribution list causes the second network device to generate a plurality of blocks of IP prefix entries based on the type of the IP forwarding table, wherein each block of the IP prefix entries is associated with one IP prefix length included in the IP prefix distribution list, wherein at least one block of the plurality of blocks of the IP prefix entries includes a number of reserved entries, and wherein the number of reserved entries is determined based on an IP prefix count corresponding to an IP prefix length associated with the at least one block.

27. The first network device of claim 13, wherein the generation of the IP forwarding table comprises generation of a plurality of blocks of IP prefix entries based on the type of the IP forwarding table, wherein each block of the IP prefix entries is associated with one IP prefix length included in the IP prefix distribution list, wherein at least one block of the plurality of blocks of the IP prefix entries includes a number of reserved entries, and wherein the number of reserved entries is determined based on an IP prefix count corresponding to an IP prefix length associated with the at least one block.

28. The method of claim 21, wherein the IP prefix distribution list causes the second network device to generate a plurality of blocks of IP prefix entries based on the type of the IP forwarding table, wherein each block of the IP prefix entries is associated with one IP prefix length included in the IP prefix distribution list, wherein at least one block of the plurality of blocks of the IP prefix entries includes a number of reserved entries, and wherein the number of reserved entries is determined based on an IP prefix count corresponding to an IP prefix length associated with the at least one block.

* * * * *